(12) United States Patent
Knox

(10) Patent No.: US 11,483,618 B2
(45) Date of Patent: Oct. 25, 2022

(54) METHODS AND SYSTEMS FOR IMPROVING USER EXPERIENCE

(71) Applicant: Gregory Knox, Van Nuys, CA (US)

(72) Inventor: Gregory Knox, Van Nuys, CA (US)

( * ) Notice: Subject to any disclaimer, the term of this patent is extended or adjusted under 35 U.S.C. 154(b) by 0 days.

(21) Appl. No.: 17/200,096

(22) Filed: Mar. 12, 2021

(65) Prior Publication Data

US 2021/0204023 A1 Jul. 1, 2021

Related U.S. Application Data

(63) Continuation-in-part of application No. 15/843,859, filed on Dec. 15, 2017, now abandoned, which is a continuation-in-part of application No. 15/188,997, filed on Jun. 22, 2016, now Pat. No. 9,894,415.

(60) Provisional application No. 62/183,605, filed on Jun. 23, 2015.

(51) Int. Cl.
*H04N 21/442* (2011.01)
*H04N 21/84* (2011.01)
*H04N 21/466* (2011.01)
*H04N 21/45* (2011.01)

(52) U.S. Cl.
CPC ... *H04N 21/44218* (2013.01); *H04N 21/4532* (2013.01); *H04N 21/4662* (2013.01); *H04N 21/84* (2013.01)

(58) Field of Classification Search
CPC ......... H04N 21/44218; H04N 21/4532; H04N 21/4662; H04N 21/84; H04N 21/42203; H04N 21/4223; H04N 21/44222; H04N 21/4668; H04N 21/42201
See application file for complete search history.

(56) References Cited

U.S. PATENT DOCUMENTS

| | | | | |
|---|---|---|---|---|
| 2007/0233839 A1* | 10/2007 | Gaos | ...................... | H04N 5/765 709/223 |
| 2007/0271580 A1* | 11/2007 | Tischer | .............. | H04N 21/4532 725/35 |
| 2012/0265621 A1* | 10/2012 | Sechrist | ............. | H04N 21/8173 705/14.73 |
| 2012/0309515 A1* | 12/2012 | Chung | .................... | A63F 13/00 463/31 |

(Continued)

*Primary Examiner* — Michael B. Pierorazio
(74) *Attorney, Agent, or Firm* — David L. Cohen

(57) ABSTRACT

A method for improving a user experience through the use of at least one communications device. The method initially senses feedback of the user experience, wherein the user experience include one or more of the following three dimensional geolocation status, temporal status, experiential status, physiological status and emotional status. The method creates at least an initial contextual data set from the initially sensed feedback, and transmits media content to the user. The method subsequently senses feedback of the user experience, creating one or more subsequent contextual data set from the subsequent sensed feedback. The method measures changes in the user experience by comparing the initial contextual data set with the subsequent contextual data set. The method generates personalized user data based on measuring changes, wherein the generated personalized data is indicative of adjustments in one or more of the three dimensional geolocation, experiential status, physiological status and emotional status of the user when the comparing of the initial contextual data set with the subsequent contextual data set.

18 Claims, 25 Drawing Sheets

(56) References Cited

U.S. PATENT DOCUMENTS

| | | | |
|---|---|---|---|
| 2014/0028920 A1* | 1/2014 | Wang | H04N 21/422 |
| | | | 348/734 |
| 2014/0358012 A1* | 12/2014 | Richards | A61B 5/6802 |
| | | | 600/479 |
| 2015/0347416 A1* | 12/2015 | Lin | H04N 21/2187 |
| | | | 707/751 |
| 2017/0064363 A1* | 3/2017 | Wexler | G06K 9/00671 |
| 2020/0092608 A1* | 3/2020 | Cruz Huertas | H04N 21/44218 |
| 2020/0228859 A1* | 7/2020 | Ho | H04N 21/4753 |

* cited by examiner

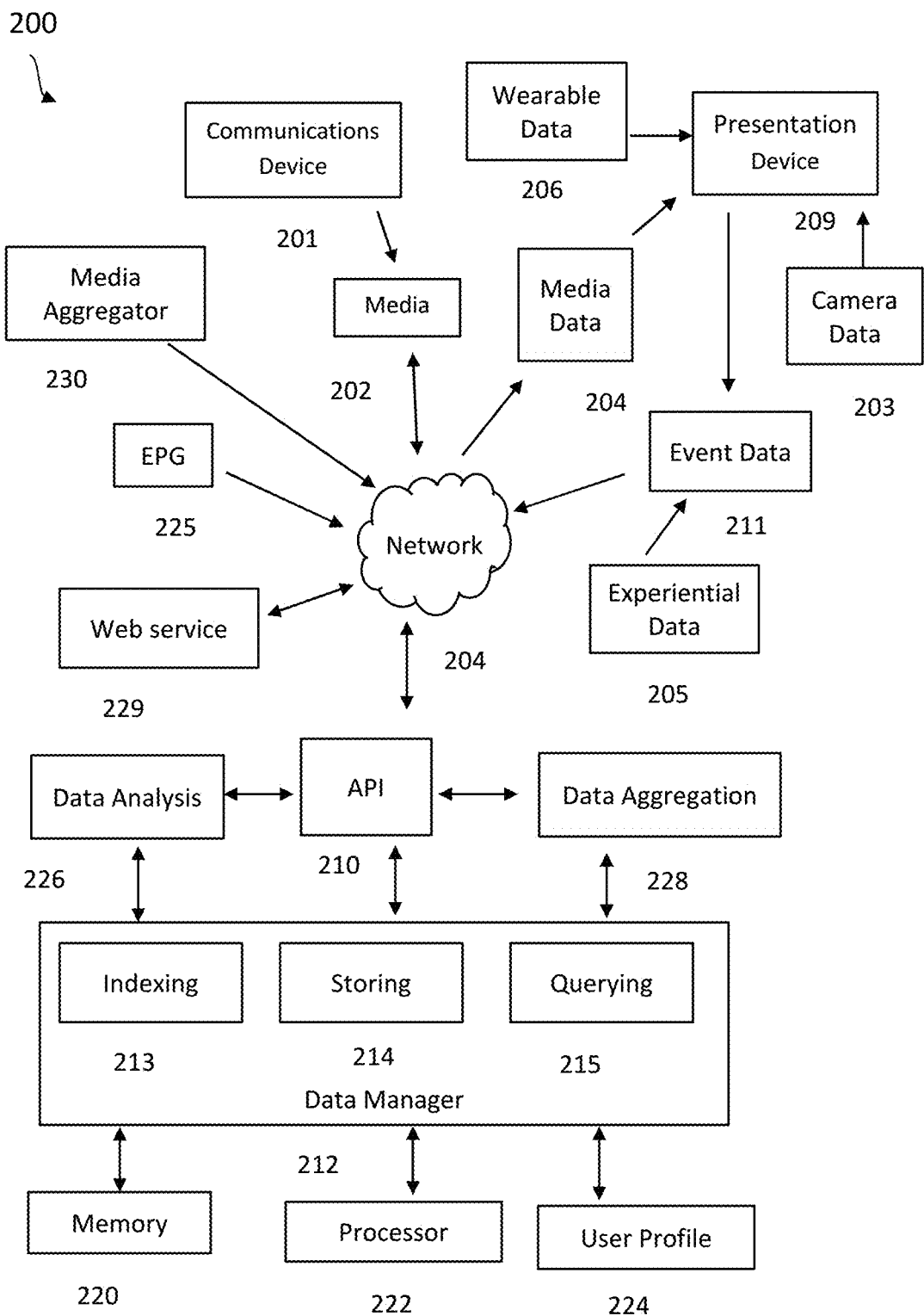
FIGURE 2-A

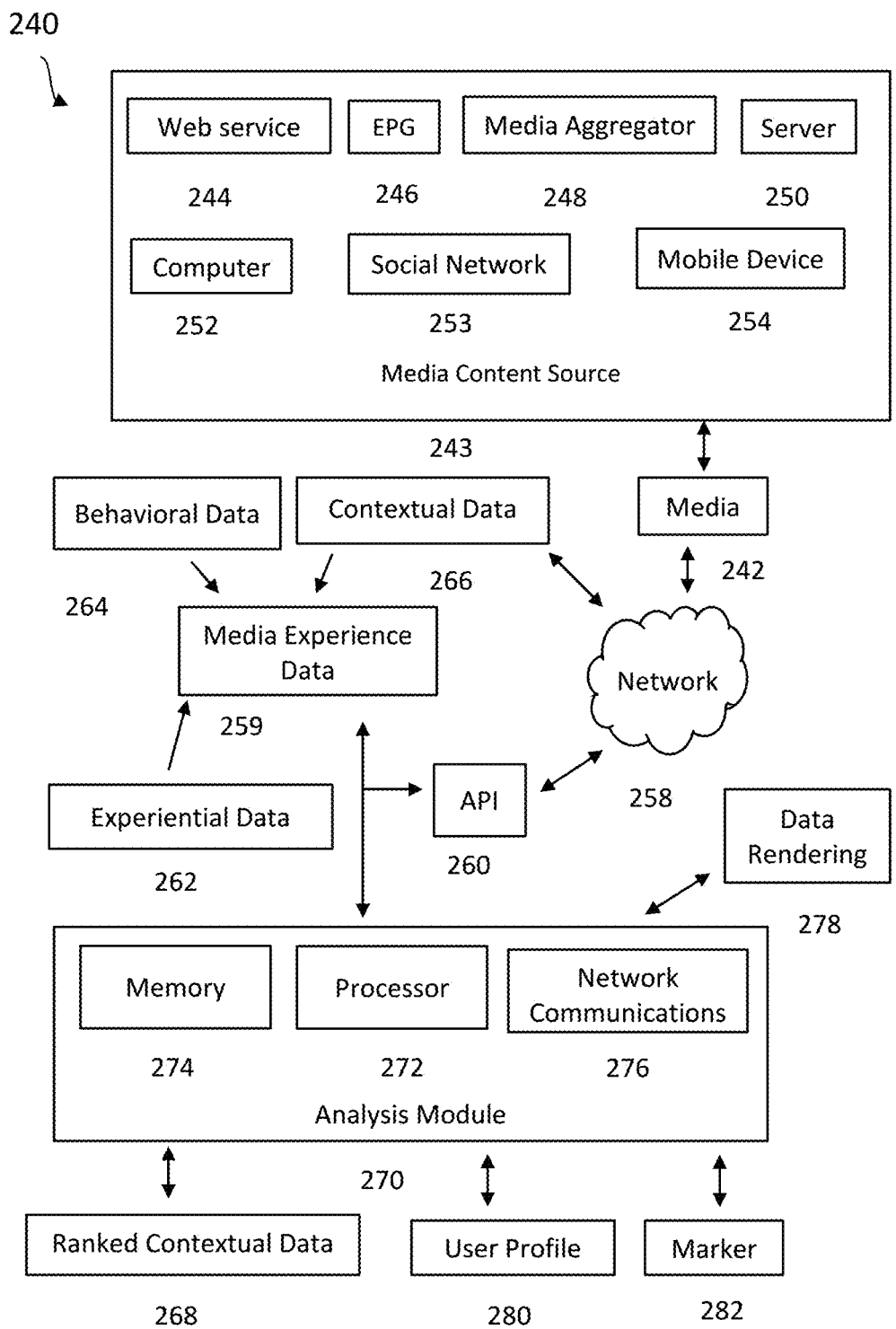
FIGURE 2-B

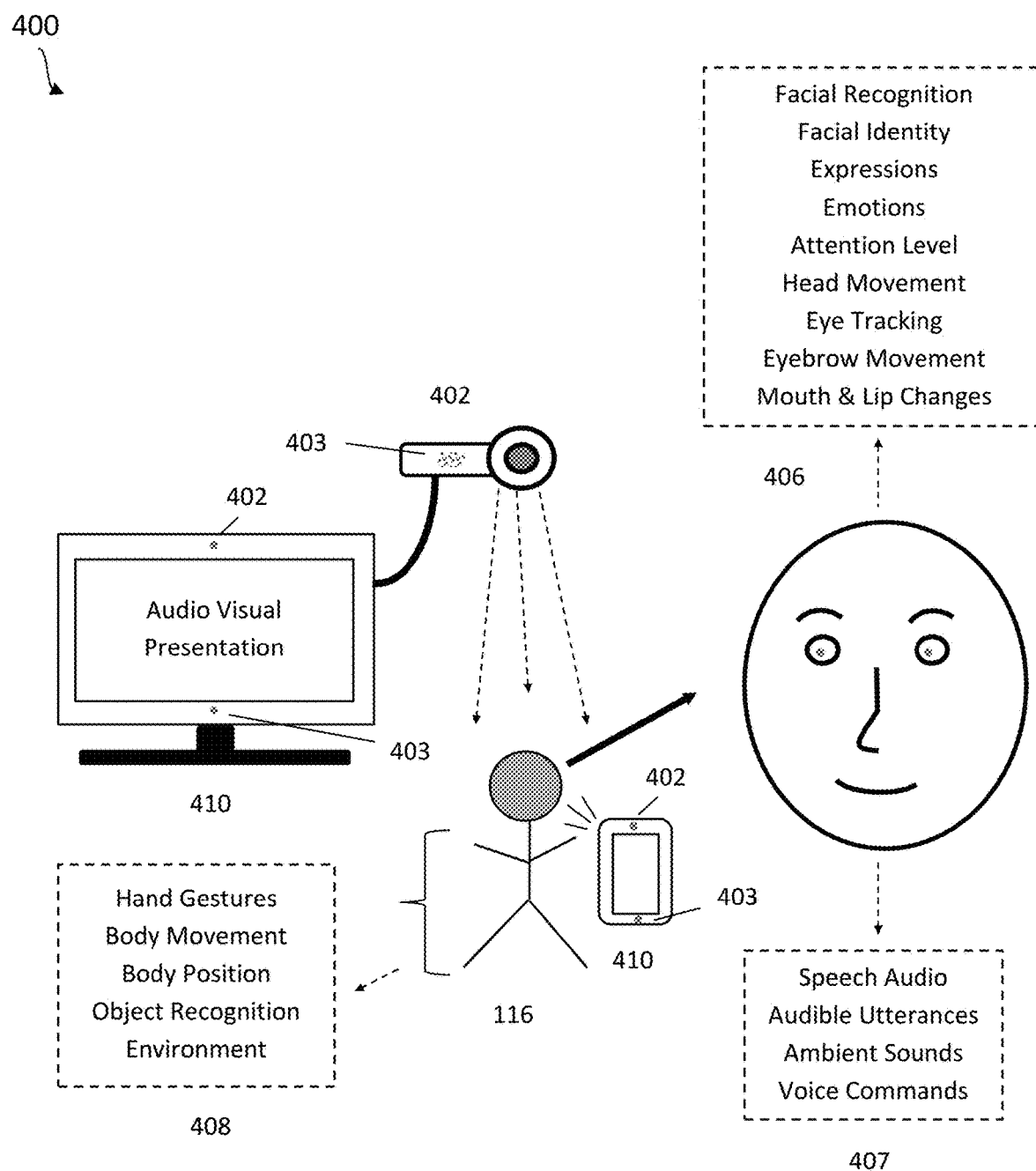
FIGURE 4-A

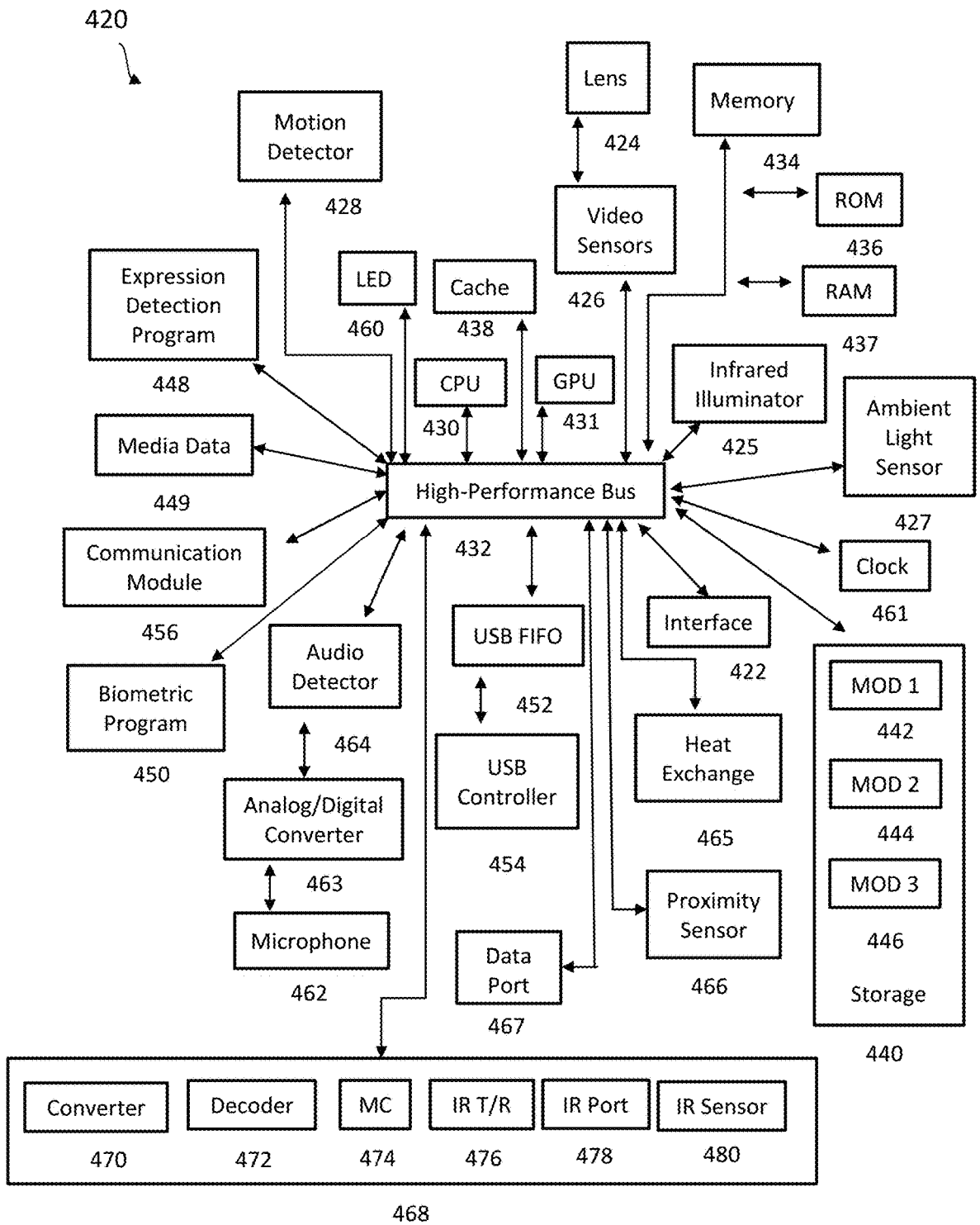
FIGURE 4-B

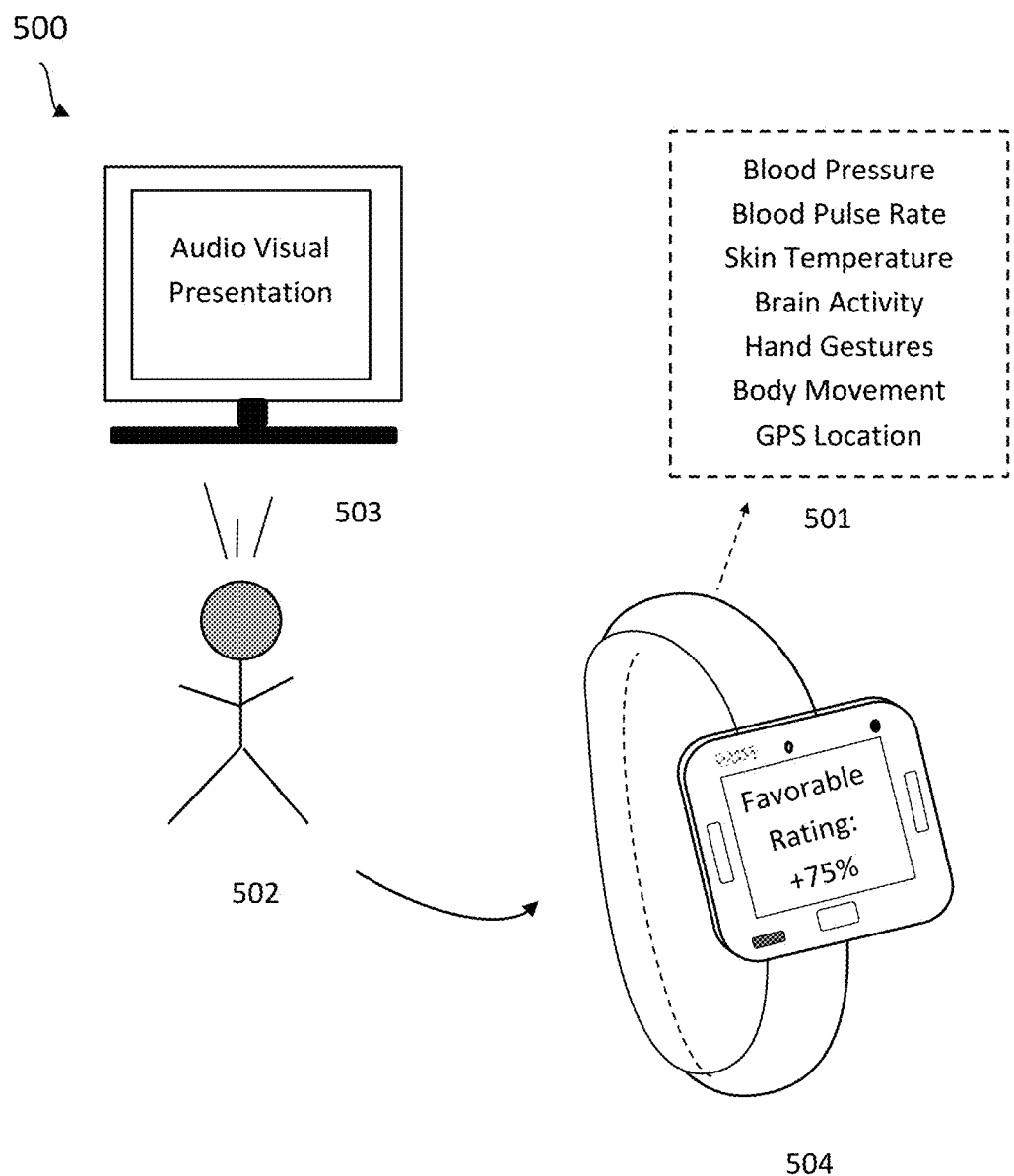
FIGURE 5-A

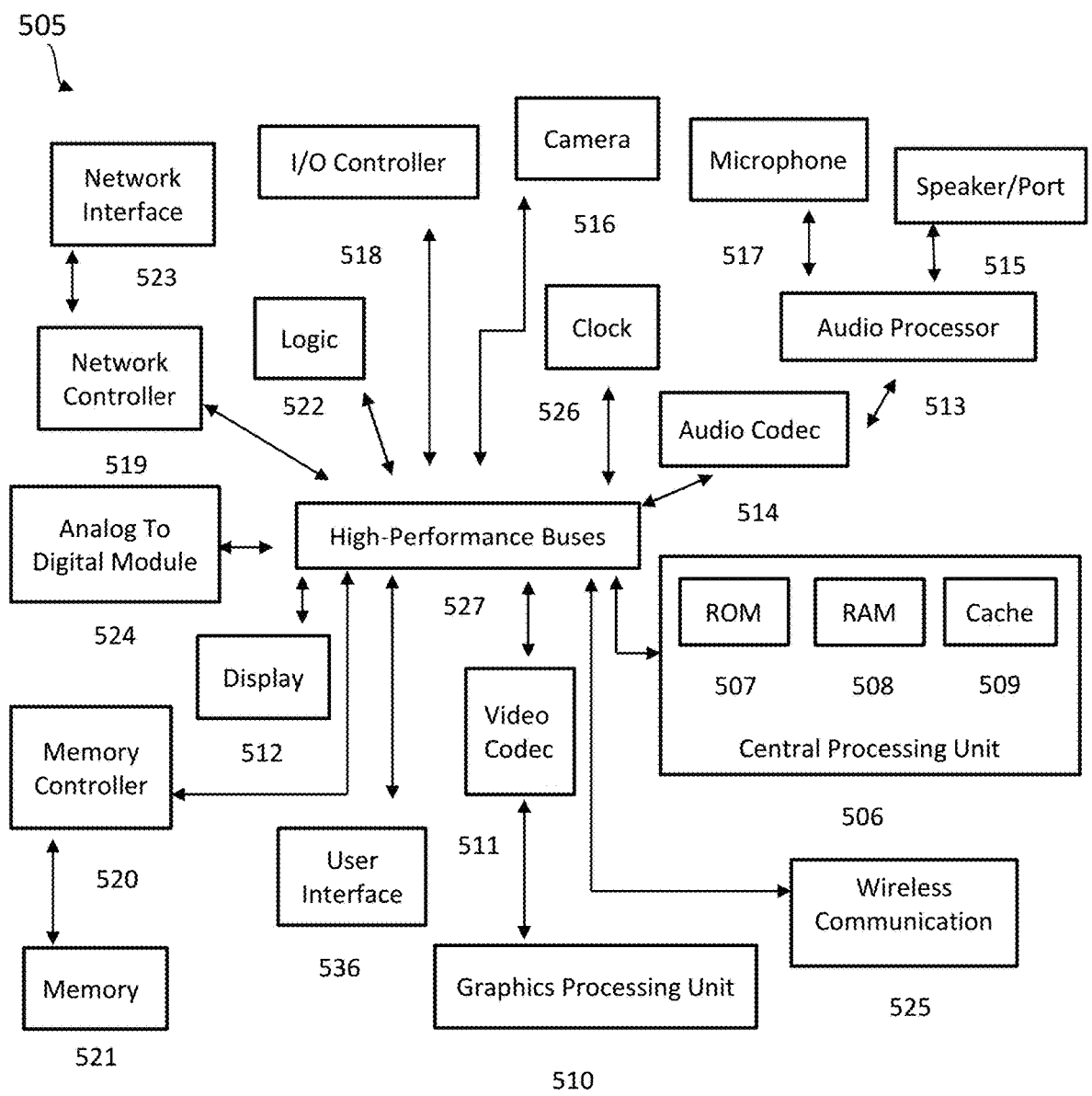
FIGURE 5-B

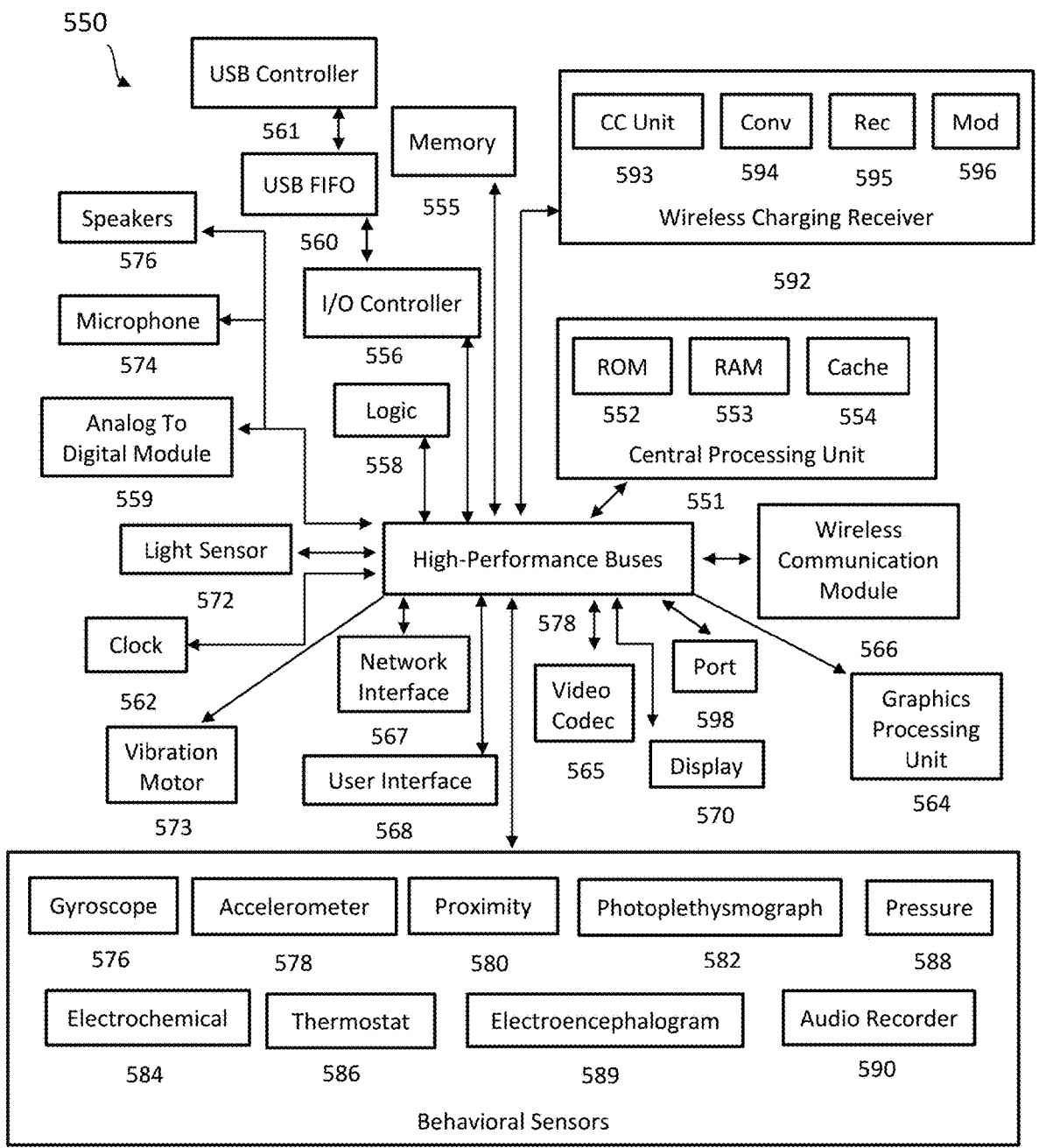
FIGURE 5-C

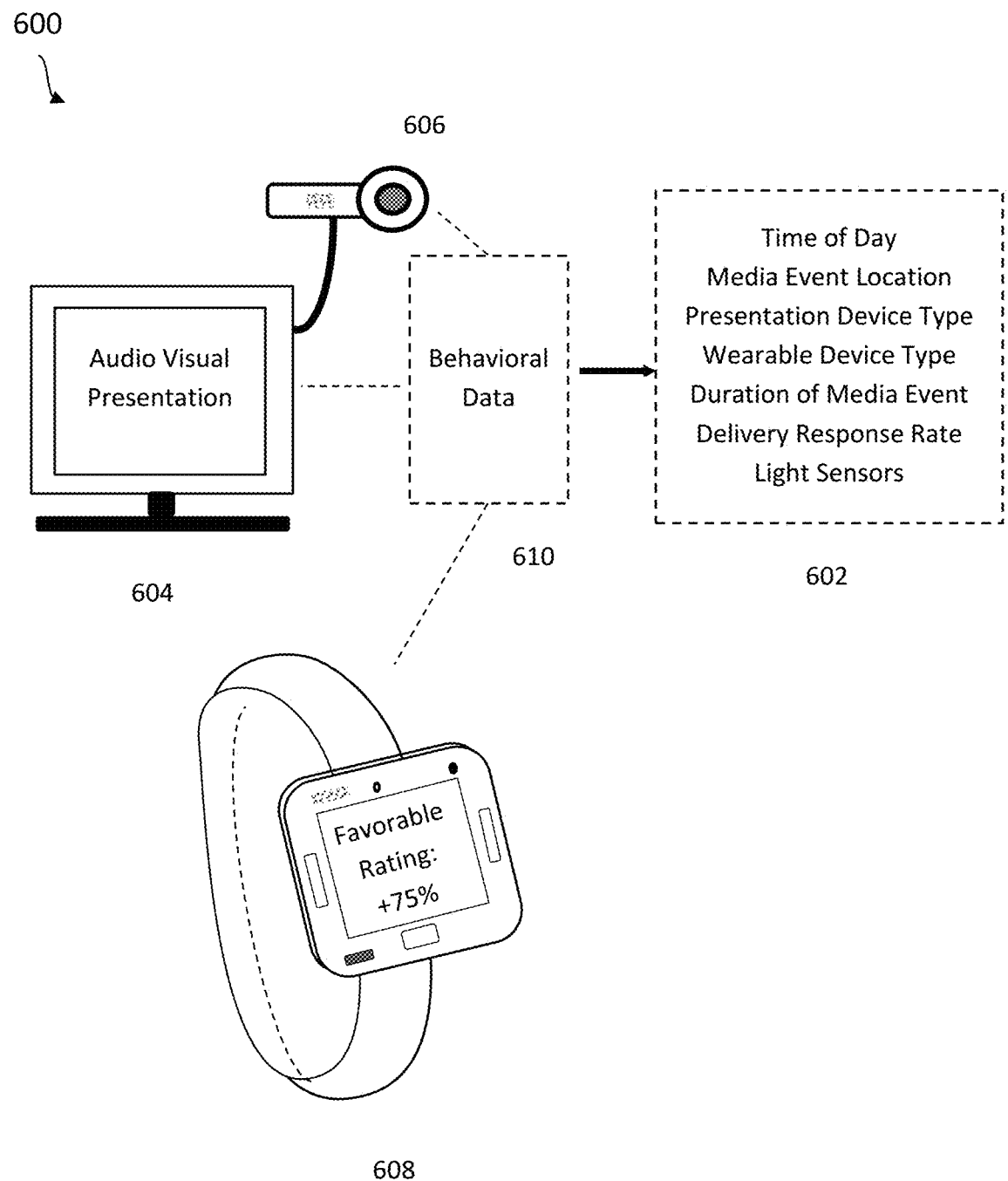
FIGURE 6-A

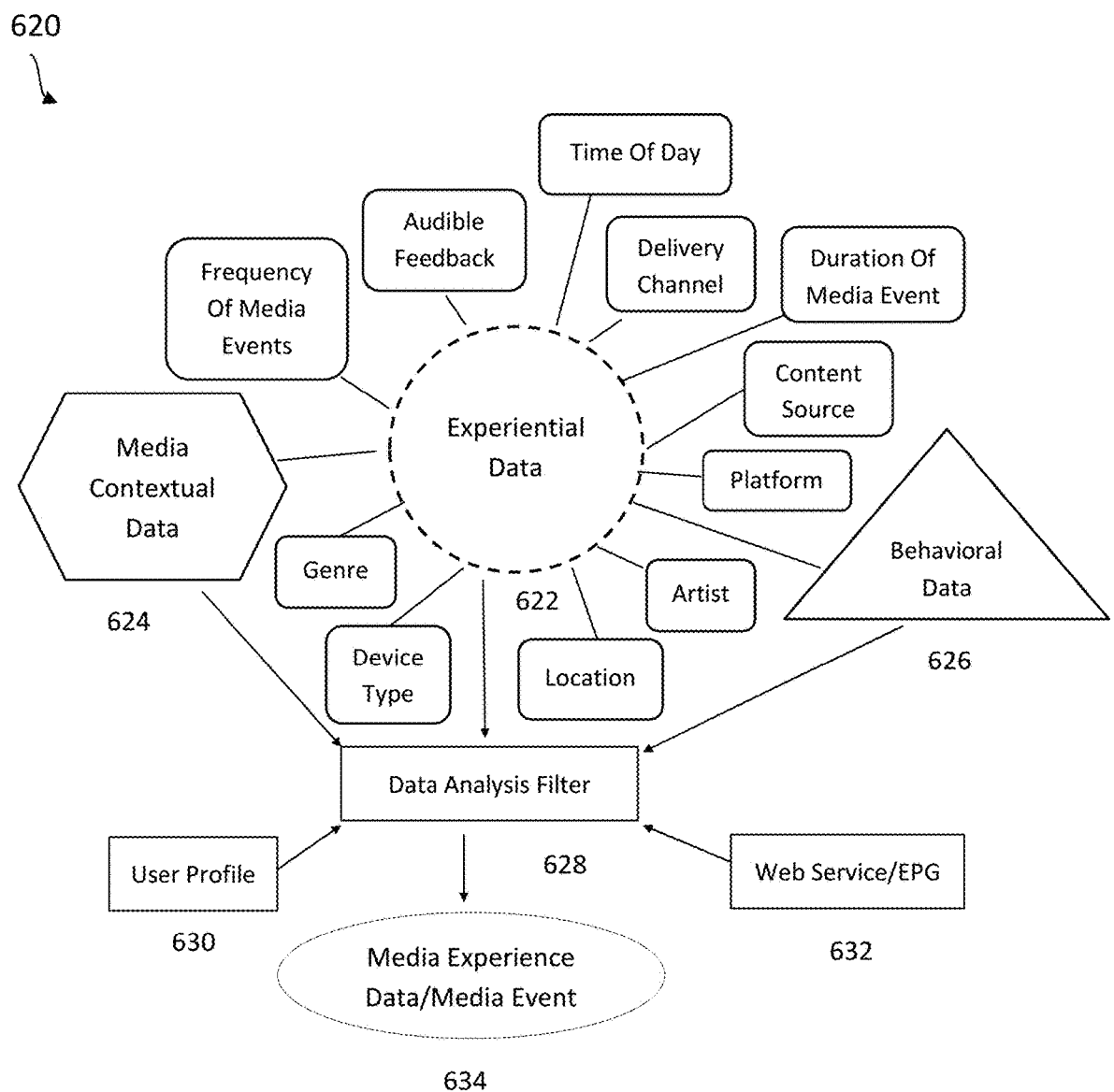
FIGURE 6-B

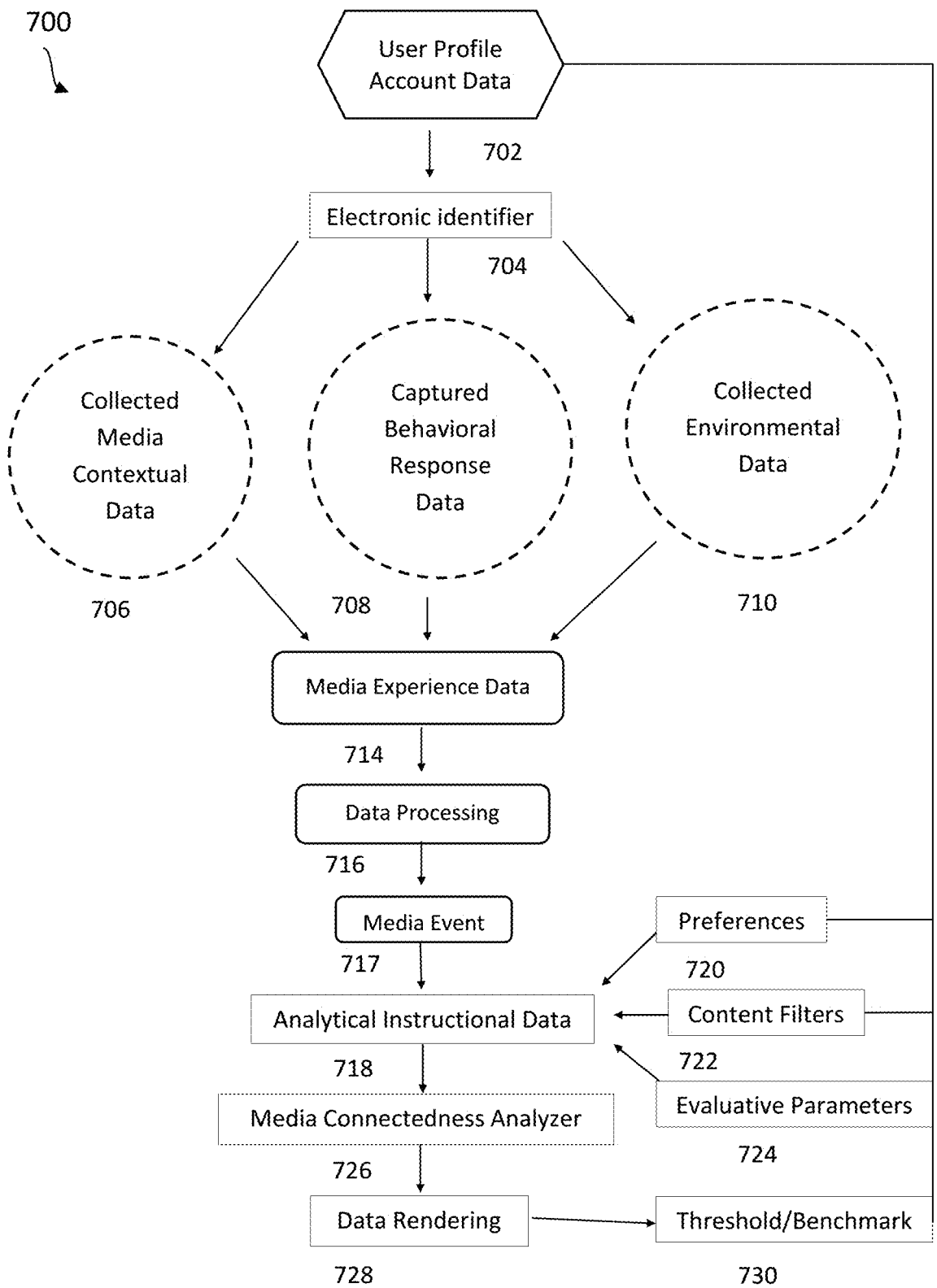
FIGURE 7-A

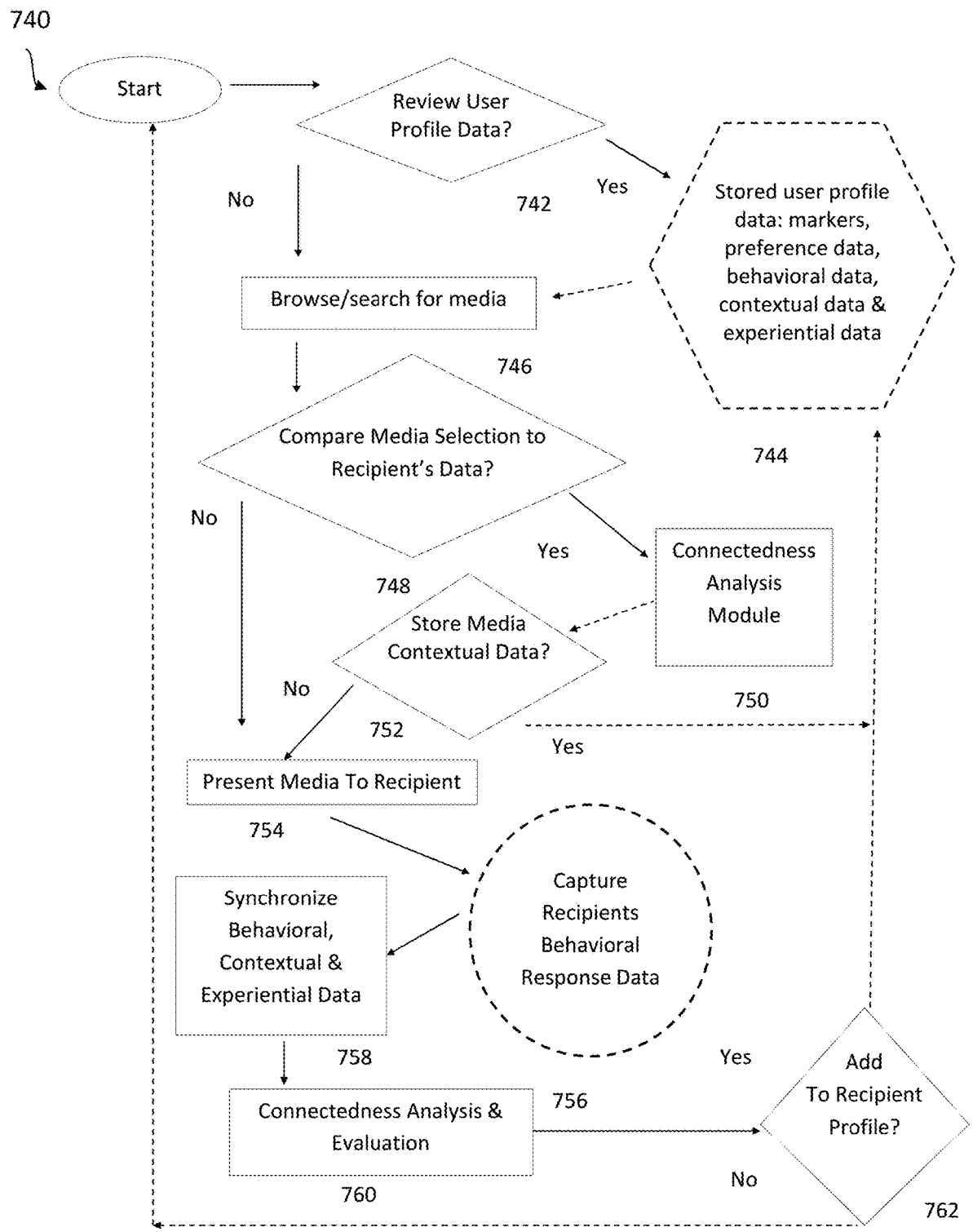
FIGURE 7-B

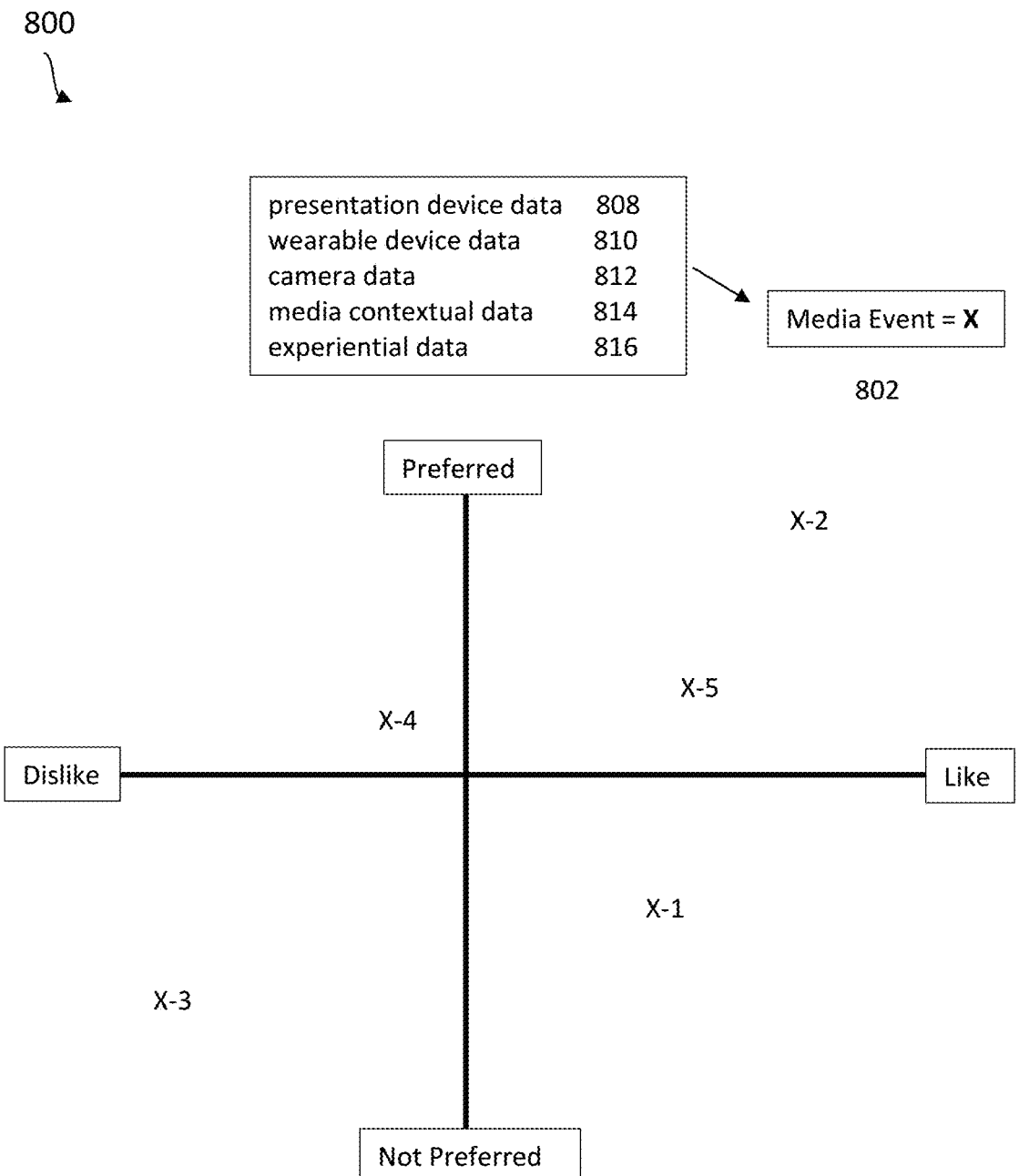
FIGURE 8-A

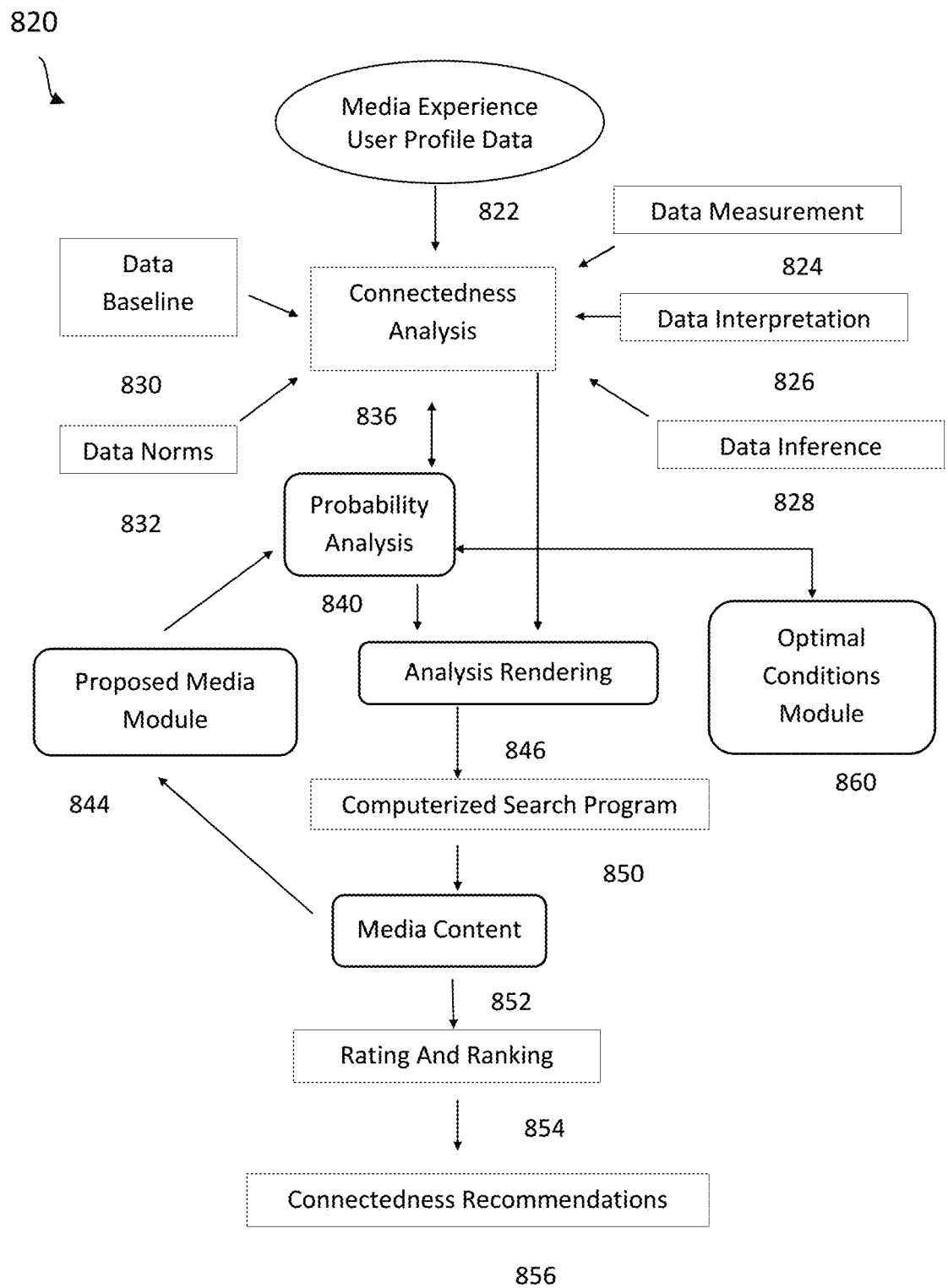
FIGURE 8-B

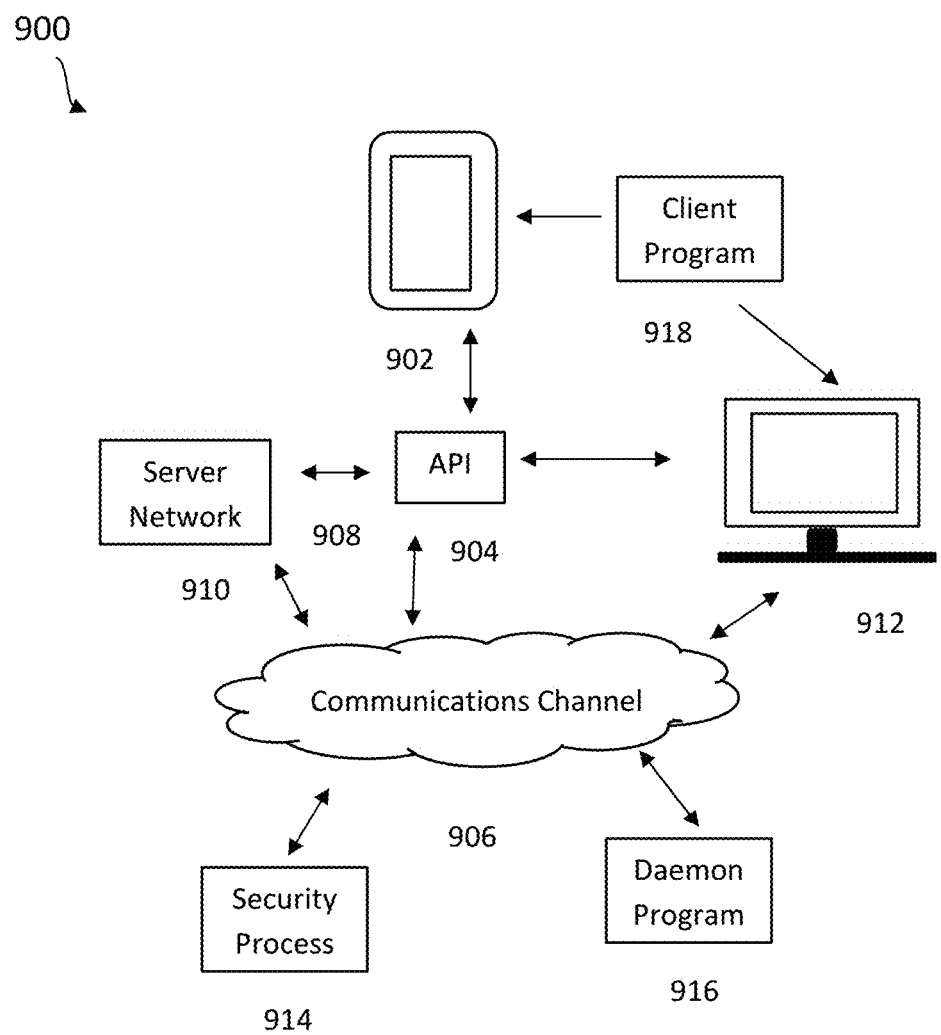
FIGURE 9-A

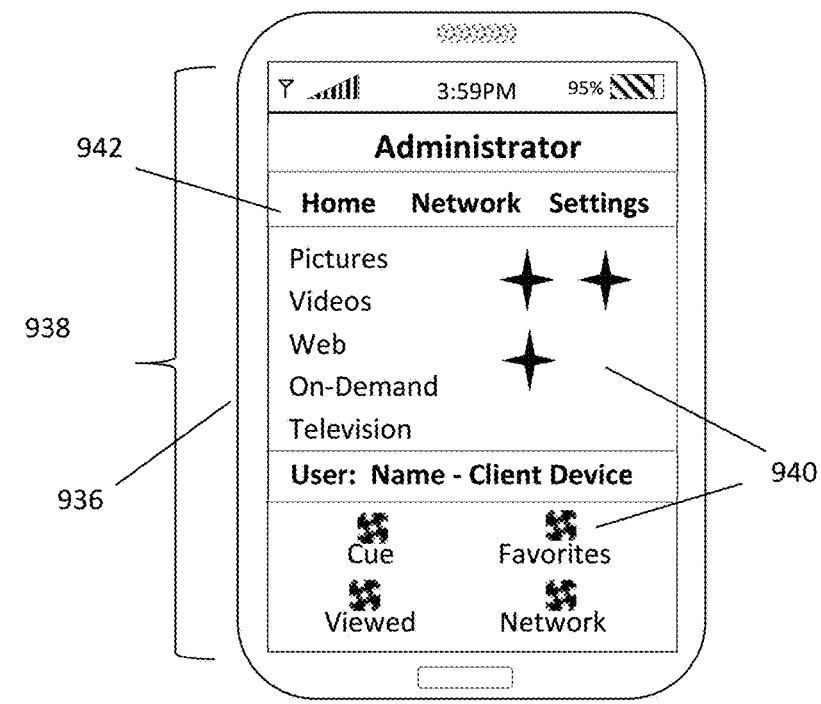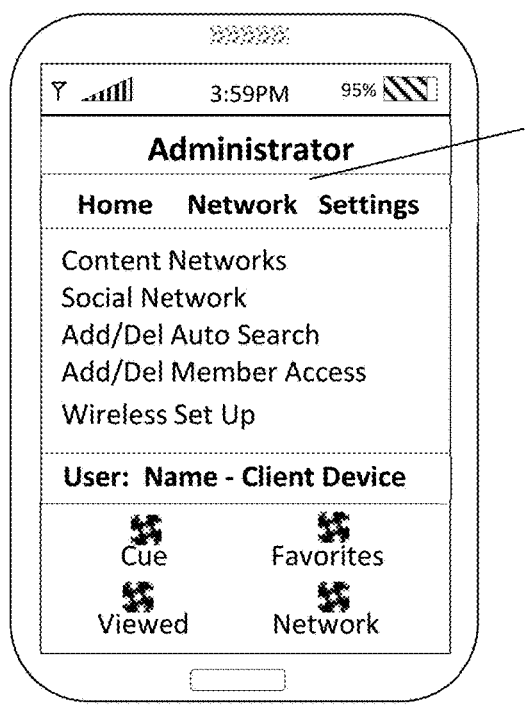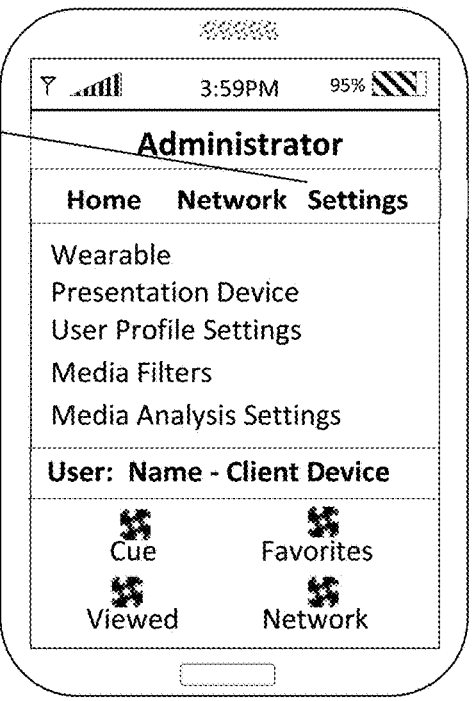
FIGURE 9-B

METHODS AND SYSTEMS FOR IMPROVING USER EXPERIENCE

RELATED APPLICATIONS

The present application is a continuation-in-part of U.S. patent application Ser. No. 15/843,859 filed on Dec. 15, 2017, which is a continuation-in-part of U.S. patent application Ser. No. 15/188,997 filed Jun. 22, 2016 by Knox and entitled "Media Experience Data System and Method" which claims the benefits of and priority, under 35 U.S.C. § 119(e), to U.S. Provisional Application No. 62/183,605 filed Jun. 23, 2015 by Knox and entitled "Media Experience Data System and Method" of which the entire disclosure each is incorporated herein by reference for all purposes.

FIELD OF THE DISCLOSURE

The present disclosure generally relates to user experiences, and more particularly to methods and systems for improving user experiences.

BACKGROUND

Every day, millions browse for media content online or on searchable databases by inputting general or very specific terms that articulate or convey a subject's tastes and preferences for media content. Passive and subconscious responses to media experiences that are spontaneous, non-verbal or involuntary can also be reliable indicators of a subject's tastes and preferences. Conscious or sub-conscious response and reaction behaviors such as blushing, laughing, elevated heart rate, blood pressure changes and the like can be identified and measured with wearable sensors and facial recognition technologies.

Captured behavioral data may provide reference points such that evaluation, estimates and predictions of a subject's taste and preference can be measured and articulated. Ongoing collection of experiential data may offer greater statistical reliability and accuracy in determining a subject's tastes and preferences or their "connectedness" to media content varieties, categories and subcategories. Such a method could support machine learning systems for media content browsing and advanced search functions that successfully interpret behavioral and biometric data.

BRIEF SUMMARY

Collecting and identifying physiological data, facial expression data, and physical activity data in correlation with media experiences can uniquely reveal a subject's tastes and preferences or "connectedness" to media content. Additionally, analysis of behavioral response data can be enhanced when associated with contextual data embedded in electronic media files as well as experiential data derived from the subject's lifestyle and media viewing habits (e.g., location, time of day, device type, etc.). Given the volume of content and sources of distribution for electronic media, passive collection of media experience data can dramatically improve efficiencies in the content search process. Capturing this information with wearable and camera technologies can provide real time data that is accurate, measurable, and create efficiencies in interpreting media preferences and executing media search applications.

In one aspect of the present disclosure, a method for improving a user experience through the use of at least one communications device is detailed. The method initially senses feedback of the user experience, wherein the user experience include one or more of the following three dimensional geolocation status, temporal status, experiential status, physiological status and emotional status. The method creates at least an initial contextual data set from the initially sensed feedback, and transmits media content to the user. The method subsequently senses feedback of the user experience, creating one or more subsequent contextual data set from the subsequent sensed feedback. The method measures changes in the user experience by comparing the initial contextual data set with the subsequent contextual data set. The method generates personalized user data based on measuring changes, wherein the generated personalized data is indicative of adjustments in one or more of the three dimensional geolocation, experiential status, physiological status and emotional status of the user when the comparing of the initial contextual data set with the subsequent contextual data set.

In another aspect of the present disclosure, a user experience system is detailed. The user experience system comprises a processor and a memory coupled with and readable by the processor and storing therein a set of instructions which, when executed by the processor. The processor and memory causes initially sensing feedback of the user experience, wherein the user experience comprises at least one of three dimensional geolocation status, temporal status, experiential status, physiological status and emotional status, creating at least an initial contextual data set from the initially sensed feedback, transmitting media content to the user, subsequently sensing feedback of the user experience, creating at least one subsequent contextual data set from the subsequent sensed feedback, measuring changes in the user experience by comparing the initial contextual data set with the subsequent contextual data set, and generating personalized user data based on the measuring changes, the generated personalized data indicative of adjustments in the at least one of three dimensional geolocation status, temporal status, experiential status, physiological status and emotional status of the user in the comparing of the initial contextual data set with the subsequent contextual data set.

BRIEF DESCRIPTION OF THE DRAWINGS

FIG. 2-A is a block diagram of an exemplary system for collecting and analyzing media event data according to one embodiment of the present disclosure.

FIG. 2-B is a block diagram of an exemplary system for obtaining media event data from various media content sources according to one embodiment of the present disclosure.

FIG. 4-A is a graphical depiction of an exemplary system for capturing and analysis of facial expressions, physical movement, and speech audio according to one embodiment of the present disclosure.

FIG. 4-B is a block diagram that schematically shows the system 420 for capturing and processing facial expressions, hand and body movements that indicate media connectedness according to one embodiment of the present disclosure.

FIG. 5-A is a graphical depiction of an exemplary system for capturing behavioral data, including physical and physiological data, associated with media connectedness values according to one embodiment of the present disclosure.

FIG. 5-B is a block diagram of an exemplary presentation device used in a system for collecting, analyzing and sharing media connectedness data according to one embodiment of the present disclosure.

FIG. 5-C is a block diagram of an exemplary wearable system for collecting physical and physiological behavioral data that indicates media connectedness values according to one embodiment of the present disclosure.

FIG. 6-A is a graphical depiction of capturing experiential data according to one embodiment of the present disclosure.

FIG. 6-B is an illustration of exemplary conditions, elements, attributes and circumstances that include experiential data that indicates media connectedness values according to one embodiment of the present disclosure.

FIG. 7-A is a flowchart of an exemplary method for processing and analyzing media event data that may be used to evaluate and measure media connectedness values according to one embodiment of the present disclosure.

FIG. 7-B illustrates an exemplary method for assigning media connectedness data to a user profile according to one embodiment of the present disclosure.

FIG. 8-A illustrates an exemplary model of dependencies which may be used to determine, infer, and/or interpret connectedness values between a subject and presented media using media experience data according to one embodiment of the present disclosure.

FIG. 8-B is a flow diagram illustrating an exemplary process for media connectedness value analysis according to one embodiment of the present disclosure.

FIG. 9-A is an illustration of an exemplary system for remote access management of media experience data over a communications channel according to one embodiment of the present disclosure.

FIG. 9-B is a graphic depiction of an exemplary process for managing and presenting media connectedness data on a computing device according to one embodiment of the present disclosure.

Figure 1:
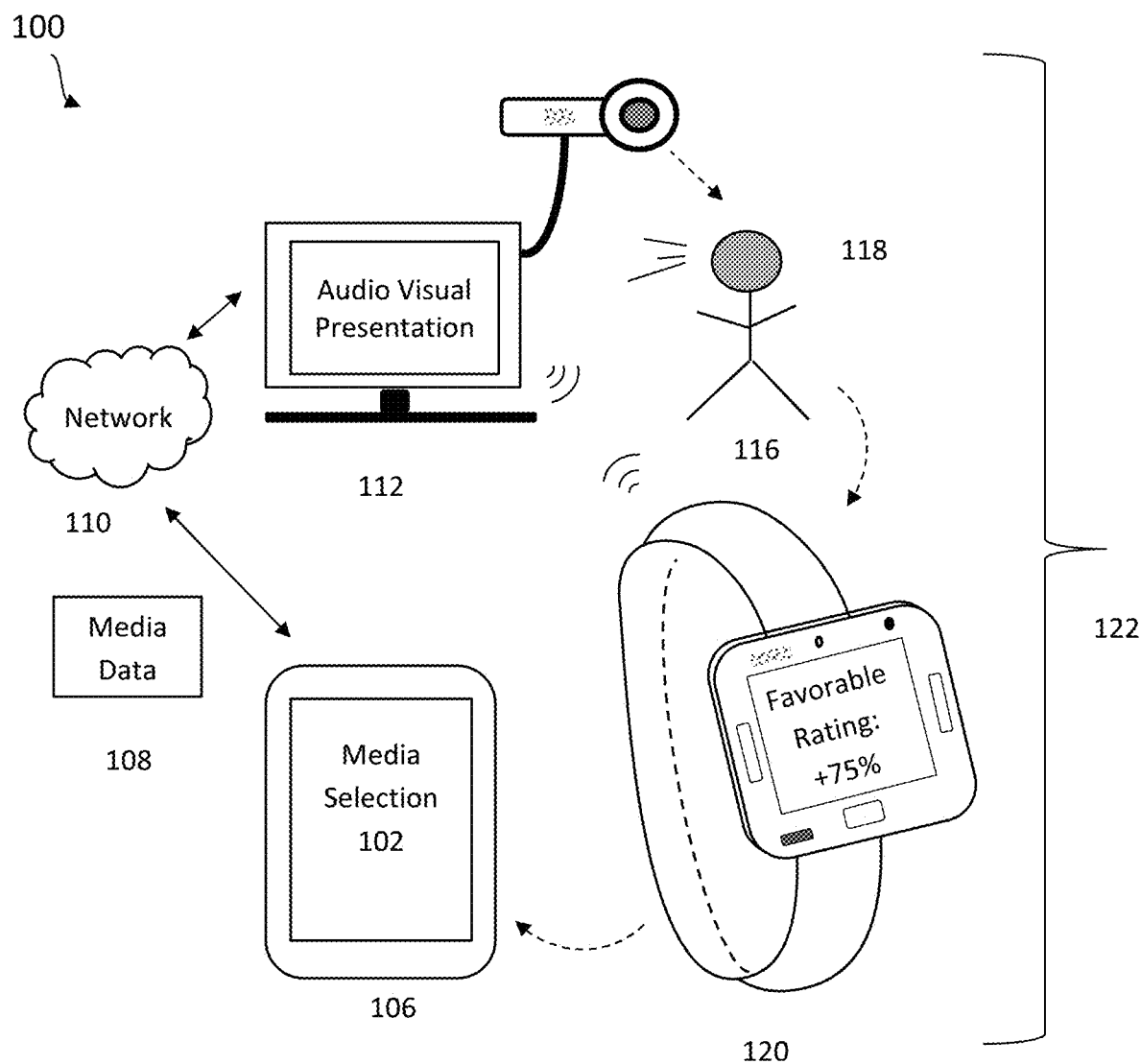
FIG. 1 is a schematic representation of an exemplary system for collecting and presenting media experience data according to an illustrative embodiment of this disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Searching for electronic media is a lifestyle experience for millions of users with devices connected to online and other networked sources. Identifying desired media can involve search terms that are general or very specific, requiring some form of cognitive input that reflects the subject's tastes and preferences. For the unsophisticated user, navigating peripheral devices and networks can be daunting, and the content search experience may be limited by the capacity to operated devices or browsing applications. Considerable time may be consumed in the search query process that delivers the desired content. And, for the technically challenged user, given the complexity of hardware interfaces and networks, there may exist little ability or opportunity to access and enjoy media that reflects their unique tastes and preferences. For this reason, a seamless experience that passively acquires media preference data and delivers media content is highly desirable.

Techniques disclosed herein describe how a system may passively acquire and measure data that measures media connectedness values between a subject and the media they experience using behavioral data, media contextual data and experiential data. It is also desirable to use this information to guide machine learning program assisted searches for media, consistent with the subject's media connectedness preferences, with increasing accuracy to provide more efficient and satisfying enjoyment of media content.

In this document, the term "connectedness" refers to the interpretations of collected media exposures related data that indicate, in any amount, the existence of a connection (or lack thereof) between the subject and the media being experienced or that may be experienced in the future. The system may use a variety of quantitative, qualitative and machine learning processes to measure media event data and determine what media connection aspects are meaningful to the subject based primarily on non-verbal, passive, and spontaneous behavioral data. This information is correlated with contextual data that identifies the media selection and experiential data collected from media event, respectively.

In this document, the term "media experience data" refers to the total information, including behavioral, contextual and experiential data that is collected, assigned, or correlated with a subject's electronic user profile and the presented media or media of similar type or category or subcategory. This information is obtained before, during and after their exposure (reading, watching, observing, listening, etc.) and response to various forms of presented media content, which may also be referred to, collectively, as a "media event." Media experience data may include: a database of media event information associated with a subject; a media event information database of aggregated user profile information associated with unique individual or groups of events; and a media event information database coupled to machine learning applications configured to process a subject's media experience data with program applications for analysis, comparison, recommendations, and predictions.

In this document, the term "behavioral data" refers to information collected by a camera or wearable device and/or sensor that measures, records, or tracks the subject's changes in physiological or physical activity. Behavioral data may include a subject's blood pressure, heart rate, skin temperature, eye movements, facial expressions (including emotions and attention levels), audible speech and sounds, hand or body movements, and the like.

In this document, the term "media contextual data" refers to any information that identifies or defines a media selection. In one embodiment, media contextual data may be a visual representation of an idea or physical matter not limited to image, photo, graphic, or words. In another embodiment, media contextual data may be embedded electronically in a media file or associated with media content that identifies a media selection by using attributes that can be indexed for search term purposes such as program name, title, category, genre, color, features, origin, subject matter, duration, file size, commentaries, and the like. In many embodiments, this type of information is typically found electronically embedded in media files using meta tags, cookies, and other electronic identifiers and may be obtained from the distribution source, a web service, the internet or a database.

In this document, the term "experiential data" identifies electronically measureable information that improves a system's and a user's ability to interpret meaning regarding connectedness values during media exposures, from the media contextual data, the subject's collected behavioral data and/or the overall media event. For example, time of day, location of the subject, time stamp of behavior response, device type, recording of the subject's spontaneous utterances and other relevant information may elevate the system's ability to interpret a subject's media event with greater accuracy. Media event contextual data may be obtained from various components in the system.

In this document, the terms "media," "content," or "media content" refer to types of media including text, images, photos, music, audio, videos, web pages, streaming video and the like.

In this document, the term "communication device" refers to an electronic device with firmware, software and hardware, or a combination thereof that is capable of network connectivity, media playback, data storage, and video telephony. A communication device may be fixed or mounted, on a desktop, portable and/or handheld. Typical components of a communication device may include but are not limited to a processor, operating system, RAM, ROM, flash memory, a camera, display, microphone, a cellular antenna, and wired and/or wireless transmission and receiving means including but not limited to Wi-Fi, WiMax, USB, cellular data networks, Bluetooth, NFC, ANT and RFID. In this document, the term "presentation device" refers to a communication device that is equipped with a camera coupled to software for capturing facial features for user identification, emotions, human expressions, physical gestures, object recognition and means for wireless connectivity to a wearable sensor or device. In some examples, the described techniques may be implemented as a computer program or application (hereafter "applications") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C #, Adobe® Integrated Runtime™ (Adobe® AIR™), ActionScript™, Flex™, Lingo™, Java™, Javascript™, Ajax, Pert, Python, COBOL, Fortran, ADA, XML, MXML, HTML, DHTML, XHTML, HTTP, XMPP, PHP, and others. The described techniques may be varied and are not limited to the embodiments, examples or descriptions provided.

In this document, the term "social network" refers to a collective network of devices, individual users, web services, web sites, program applications, and media aggregation sources associated with a subject's user profile. The association may be created by automated means or by physical input from a user of the system. Information and data regarding social network activities may be transferred and communicated within the social network of the system to improve analysis and interpretation of media experience data. Analyzed media experience data may be shared to assist the social network efficiencies in locating, comparing, and presenting desirable media content to the subject.

In this document, the term "wearable device" refers to a portable device or sensor appliance that is worn about the body, and equipped and with sensors attached to the skin for tracking, monitoring and recording biometrics and physical activity, collectively referred to previously as "behavioral data." Examples of wearable devices include but are not limited to a wristband, watch, arm band, pendant, headband, earpiece, and the like. Sensors may capture biometric data including but not limited to physiological and physical activity such as blood pressure, pulse rate, skin temperature, head and body movements, hand gestures, geolocation as well as proximity to; other system components; other user devices, GPS coordinates, objects and persons within the visual capture range of an associated camera.

In this document, the term "synchronize" or "sync", "analyze", or "compare" refers to associating behavioral data, media contextual data, and/or experiential data with a specific media event. Synchronization may include a process where a subject's spontaneous behavioral responses are recorded and tracked in real time during the media event. This information is associated with media contextual data previously collected. Lastly, experiential data is also collected and combined with the above data to further increase accurate and consistency in measurements, estimates, inferences, and conclusions regarding media connectedness data values. Synchronization, sync, analysis, or comparison may refer to software, firmware, hardware, or other component that can be used to effectuate a purpose. Software instructions may be stored in a memory of system devices and program instructions are executed with a processor that manages and controls various components.

The present disclosure provides a description of various methods and systems associated with collecting and sharing media experience data that may be used to interpret various aspects of connectedness values between a subject and presented media before, during, and after the media experience or media event.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a schematically illustrated exemplary system 100 for collecting and sharing media experience data 122 according to one embodiment of the present disclosure. The system components may include a communication device 106, a network 110, a presentation device 112 equipped with a camera 114, and a wearable sensor device 120. The network 110 may include a combination of computers, servers, internet, and cloud based computing and storage systems. Any number of communication devices 106 may have access to the network 110. The communication device 106 may send a media selection 102 and associated data 108, hereinafter referred to as "media contextual" data 108, to the presentation device 112 via the network 110. The presentation device 112 is equipped with audio visual means for presenting the media selection 102. Presenting media may involve an electronic display, broadcast, or playback of the media content, and may include any combination of watching, reading, listening to, and/or observing the media selection 102 which may include any one or more media forms including text, graphics, video, photos, music, voice, audio, and the like.

The presentation device 112 is equipped with at least one camera 114 that identifies, tracks measures and records audio, human attributes, facial features, facial expressions, emotions, attention levels, body movement and detects objects during the media presentation. Attributes and features may include facial landmarks and dimensions (nose, mouth size, eye location) hair color, skin color, eye color, freckles, wrinkles, eyebrow dimensions, glasses, facial size and dimensions, hair line, facial hair, approximate age, and etc. The camera 114 may be equipped with a microphone for capturing audio sounds. The camera 114 may identify, record, track and measure movement, gestures or changes to the head, face, eyes, and/or mouth of a subject 116. In one embodiment, the camera 114 may be operated with computer application algorithms that use mathematical and matricial techniques to convert images into digital format for submission to processing and comparison routines. In some embodiments, processed data such as eye movement, head movement, body movement, body position and other human actions may be used to determine emotional state information associated with subject 116. In some examples, emotion state information may be interpreted and/or measured by the system 100 using on facial expressions and emotion recognition analysis identifiers signals used for coding facial behavior, such as the Facial Action Coding System (FACS). In some further examples, system 100 may operate automated processes forace and facial landmark detection, 2) face texture feature extraction, 3) facial action classification and 4) emotion expression modelling. In some other embodiments, processed data such as eye movement, eye gaze, head movement, head pose, body movement, body position and other human actions (mouth, eyebrow, eyelids) may be used to determine attention information associated with subject 116. Attention information may be interpreted and/or measured as varying levels or degrees of viewer attention including but not limited to focus, distraction, intensity and similar identifiers. In some further examples, attention categories and levels may be identified with values and scores. In further embodiments, system 100 facial identification and emotion recognition components may use popular analysis techniques such as geometric, three-dimensional face recognition, photometric, Facial Action Coding System, or Principal Component Analysis (PCA) with Eigen faces derived from the covariance matrix of the probability distribution over the high-dimensional vector space of face images, Linear Discriminate Analysis, Elastic Bunch Graph Matching fisher face, the Hidden Markov model, and the neuronal motivated dynamic link matching, and the like. The camera 114 may incorporate one or a combination of the aforementioned techniques to identify a subject's behavioral data including facial expressions, emotions, attention level, vocal expressions, bodily posture and movements. The presentation device 112 may identify experiential data 118 that reveal the environmental conditions and circumstances of the subject's 116 exposure to the media selection 102. Experiential data 118 involves electronically measurable information that may include but not be limited to plotting locations, time of day, light level, viewing setting temperature, type of device, number of people in the camera's 114 view field, specific individuals detected by the camera 114 during a media event, objects detected by the camera 114 during a media event, duration of media exposure sessions, aggregated attention level of audience during media event, proximity to presentation device 112, a timestamp of behavioral data associated with specific aspects of the presented media, and the like. The presentation device 112 is connected wirelessly to a device worn by the body of the subject 116, hereinafter referred to as a "wearable" device 120. The wearable device 120 is equipped with sensors that capture physiological and physical activity data before, during and/or after the media presentation.

Individually, media contextual data 108, data captured by the camera 114, experiential data 118, and data from the wearable device 120 may be identified or tagged by the presentation device 112 with electronic markers. In some embodiments, an electronic marker may be identified using a software program or a radio frequency sensor. Collectively, this group may be tagged as a unique data set and will hereinafter be referred to as media experience data 122. In some embodiments, media experience data 122 may be comprised of collective information obtained from: a single media event; a group or series of media events; historical data media contextual data 108 and experiential data 118 with an electronic user account; a compiling and comparing previously unknown media contextual data 108 with historical preference information associated with a subject 116 while exposed to said media selection in various capacities and settings. Exposures may include one or more of the totality of audio, visual, and sensory experiences manifested by reading, watching, observing, listening, etc. to various forms of media content. Examples of a media event in which media experience data 122 is generated may be reading an e-book, observing a web page, looking at family photos, watching a movie, hearing a song, or seeing streaming video. The system 100 may analyze the collected media experience data 122 and render a connectedness data value 124.

FIG. 2-A is a diagram of an exemplary system 200 for collecting, analyzing and sharing media experience data 122 associated with a media selection 202 and media events 211 according to one embodiment of the present disclosure. The system 200 may include an application program interface (API) 210, data manager 212, data analysis 226, and data aggregation 228. The API 210 may be downloaded and installed from a web service 229 on a portable or fixed communication device 201 to establish protocols for software components and network connection 232 between the communication device 201 and the system 200. The API 210 may access the computerized non-volatile or flash memory of the communication device 201 to select media processed by the system 200. The API 210 may access browsing and search functions of the communication device 201 to search for content via a network 232 online and media managed by web services 229 and media aggregation sources 230. The API 210 may allow the user to send and receive information to various components and other users of the system 200. The API 210 may enable a user to log in and operate security or encryption functions available on the communication device 201. The API 210 may provide a means for a user to request the system 200 to assign, store, analyze, retrieve and query data associated with an electronic user profile 224, presentation device 209 and other devices in the system 200.

The API 210 may direct media selections and media event data to the data manager 212. The data manager 212 may provide control for indexing 213, storing 214, and querying 215. The data manager 212 may store and retrieve data from a computerized non-volatile or flash storage memory 220. The data manager 212 may index, store, or query data in accordance with parameters set by an electronic user profile 224. Parameters that direct the data manager 212 and associated data management applications may determine qualitative and quantitative aspects of search queries, preference filters, data capture, and the like. The data manager 212 may analyze a media selection 202 to index 213 and store 214 the media contextual data 204, prior to a request for the system 200 to send the media selection to the presentation device 209. The data manager 212 may access the data aggregation block 228 to locate indices related to media selections 202 from a web service 229, an electronic program guide (EPG) 225 for television media, media aggregation sources 230, and the like. The data manager 212 may analyze and collect media experience information including behavioral data, media contextual data, and experiential data associated with a single media event 211 or multiple media events 211.

The data manager 212 may control and/or define indexing 213 based on an automated process or prompt for human input. Indexing 213 may be performed in accordance with parameters set by an electronic user profile 224 or by an automated computerized program. Parameters for indexing 213 media selections 202 may include the associated contextual data 204 which includes any electronic information embedded in the electronic file processed by the system to determined connectedness values and measurements. For example, if a search query presents a media selection with embedded contextual data 204 that identifies, describes, clarifies, delineates, and/or distinguishes the media selection for the purposes of determining connectedness between the subject and the content, then that information is added to existing indices or a new index is created in the system. In one embodiment, the subject's user profile preferences may define specific descriptive information (e.g., named title, named artist, named genre, format, etc.) the system may use to narrow queries and create more efficient search results. The data manager 212 may identify connectedness values and measurement data with a single index or combination of indices including but not limited to program name, program title, program length, category, artist(s), author, genre, origin, file size, file type, date created, date modified, publication date, distribution, meta data information and commentary.

Behavioral data from a camera 203 and wearable data 206 may be indexed based on human attributes, facial expressions, emotions, attention level, body movement, audible responses, device type, viewing location, viewing environment, audience members detected, viewing frequency, viewing session duration, physical and physiological changes and the like that indicate a range of favorable or unfavorable responses to media selections. One or more behavioral responses, in any combination, sequence, pattern therein, may indicate a subject's preference or lack thereof for a specific media selection. For example, in response to a photo, a frown may indicate displeasure or lack of satisfaction. In another example, in response to a news article, an intense stare without head movement may indicate a definite affinity or interest. In yet another example, in response to a video, a smile, elevated pulse rate, and hand clapping may indicate strong connectedness.

Experiential data 205 may be indexed based on environmental conditions and circumstances that may influence connectedness values and measurements. One or more experiential data 205 values may indicate a subject's 116 preference or lack thereof for a specific media selection. For example, in the morning hours a subject 116 may have a strong preference to read daily news websites compared to entertainment web sites during other hours of the day. In another example, for movie watching, the subject 116 may prefer to watch on a specific presentation device such as a smart TV compared to other smaller or portable devices on the system. In yet another example, the speed of response to an alert indicating a new media selection is available may indicate the best time of day to interact with the subject 116. In one embodiment, experiential data 205 may include a timestamp that associates a particular behavioral reaction or response from the subject 116 with a specific time during the playback or presentation of media content.

The API 210 may direct media selections 202 and media event data 211 to a data analysis block 226. The data analysis block 226 may include artificial intelligence (AI) or machine learning-grade algorithmic programming and instructions based on known techniques such as pattern recognition, classifiers, fuzzy systems, Bayesian networks, behavior based AI, decision trees, and the like. The data analysis block 226 components may include program code, non-volatile or flash memory 220, and a single processor 222 or multiple processors or a networked group of processors connected to a single or networked group of computerized components. The data analysis block 226 may provide analysis results for media selections 202, media data 204, camera data 203, experiential data 205, wearable data 206, and media event data 211 relating to measuring connectedness value between the subject and the media selection 202 being analyzed. The data analysis block 226 may communicate with various components of the system 200 using the API 210. The data analysis block 226 may operate in conjunction with the data aggregation block 228, data stored in available memory 220, a web service 229, and a media aggregator 230 to provide analysis results.

In one embodiment the data analysis block 226 may provide analysis of media event data 211 that is streaming in real time. In another embodiment the data analysis block 226 pre-screens media before it is sent to the presentation device based on user profile parameters, settings, and content filters. In yet another embodiment the data analysis block 226 may perform analysis of a single data set or multiple data sets to determine connectedness value or measurements. In yet a further embodiment the data analysis block 226 may perform analysis of a single or multiple media events accessible on system 200 to determine connectedness values or measurements. The data analysis block 226 may receive media selections 202 from the API 210 that were sent from a computer automated media search system managed by a web service 229, an EPG 225 or media aggregator 230. For example, if a search query presents a media selection 202 for presentation to a subject 116 that has only a few indices or a small amount of contextual data 204, the data analysis block 226 may operate in conjunction with the data aggregation block 228 to search available media content sources such as a web service 229 or media aggregator 230 and identify and index additional contextual data for use by the system 200. In another example, media event data 211 may be rendered as a particular data set value or measurement outcome for comparison, recommendation and prediction processes, which in turn may be converted to data markers 282 used as a threshold or benchmark to determine connectedness. This benchmarked media event data set 211 may be analyzed in comparison to past and future media events for reference.

FIG. 2-B is a diagram for an exemplary system 240 for using media experience data 259 to identify desired media content from various electronic media content sources 243 according to one embodiment of the present disclosure. The system 240 may interface with media sources including web services 229 such as web sites and search engines 244, an electronic program guides (EPG) 246 from services such as Time Warner Cable, Comcast, Direct TV, Dish Network, media aggregation sources 248 such as YouTube and Pinterest, media libraries located on remote and local servers 250, networked computers 252, social networks 253 such as Facebook, and mobile communication devices 254. The internet or a computerized network 258 may be used for communication between the various devices. Media content may be identified in the system 240 by contextual data 266 including but not limited to program name, program title, program length, category, artist(s), author, genre, origin, file size, file type, date created, date modified, publication date, distribution, meta data information and commentaries. Media content sources 243 may also present contextual data in media catalogs, indices, media libraries, program menus, and program schedules and the like.

In one embodiment, media event data 211 or media experience data 259 may be used, based on thresholds for media connectedness values with a particular subject 116, to initiate and complete the purchase and delivery of a physical product or download of media content 242 to the presentation device 209 from a media content source 243 with a payment system application and/or an electronic commerce account 284 associated with the user profile 280. For example, if a physical product is identified with contextual data by a web page, video or the like, and the media experience results in media event data 211 or media experience data 259 at or above a specific level, then that product may be automatically purchased via electronic account 284 and delivered to the subject 116 at a physical location. Likewise, if a multimedia program is presented that results in media event data 211 or media experience data 259 at or above a specific level, then that multimedia program product may be automatically purchased via electronic account 284 and delivered via an internet means such as a streaming service, web portal, remote server, or download to the subject's 116 presentation device 209.

The system 240 may be managed with an application programming interface (API) 260 that provides protocols for software components to interface with the devices on the system that transfer and exchange data. In some embodiments, API 260 is API 210. The API 260 may download or access instructional data from a media content source 243 to aid in media search processes, data transfers and exchanges. The system 240 may generate media experience data 259 that indicates connectedness values between a subject 116 and presented media content 242 by utilizing analysis module 270 including but not limited to associating experiential data 262, behavioral data 264, including physical and physiological information, with contextual data 266 embedded in electronic media files that have been presented to a subject. The system 240 may analyze media experience data 259 stored in an electronic user profile account 280 to establish norms and baselines for measuring, interpreting, comparing and the like. The system 240 may use these data norms and baseline data sets to identify and rank the contextual data 268 in accordance with media content search instructions input by human means or an automated means managed by the API 260. The API 260 may use an analysis module 270 to perform a comparative analysis of the identified and/or ranked contextual data 268 to contextual data 266 that identifies and describes media content 242 located on media sources 243. The API 260 may use the analysis module 270 to perform a comparative analysis of media event 211 data sets for reference, as well as individually compiled data points and subsets of the specific media events including camera data 203, wearable data 206 and experiential data 205. For example, if a series of five similar images are viewed and logged as separate media events, the system may compare only the collected experiential data, excluding camera and wearable data, to better establish norms and baselines that may allow the system 240 to better calibrate to s subject's tastes and preferences and develop statistic profiles.

The analysis module 270 may include one or more processors 272, a memory module 274 to store instructions, and network communications module 276 to interface with devices on the system 240. The analysis module 270 may include a computer program application embodied in a non-transitory computer readable medium for media contextual data comparative analysis. The computer program application may include code for collecting media contextual data, code for comparative analysis of media contextual data, and code for rending comparative analysis results. The analysis module 270 and API 260 may sync, download, or work in conjunction with electronic search programming by automated means or human input. The analysis module 270 and API 260 may render 278 media content search results in a variety of forms such as a list, a ranking, a percentage, a graph, an image, alphanumeric text, or the like. The rendered analysis results may also be stored in an electronic user profile account 280. In one embodiment the API 260 and analysis module 270 may interface with an electronic program guide (EPG) 225 or media source 243 that includes a program schedule with contextual data 266 that includes broadcast dates, air time, show times, descriptions, artists, commentaries, and the like. The system 240 may use the program schedule contextual data 266 to sync with a calendar that is managed by the API 260. Schedule updates, alerts and reminders can be utilized and shared between users and devices including remote and local servers 250, networked computers 252, and mobile communication devices 254 in the system 240.

The API 260 may be assigned an electronic marker 282 to identify contextual data 266, behavioral data 264, experiential data 262, media content 242, collective media experience data 259, ranked contextual data 268, and rendered data 278. A marker 282 may be associated with behavioral data that is timestamped. A marker 282 may be used to identify data, groups of data, an index, or indices. A marker 282 may be used to identify a user profile 280 and associated data. A marker 282 may be used by the data analysis, in aggregation, indexing, assigning and storing functions of the system 240. A marker 282 may be assigned to the location of a media content source 243. A marker 282 may be used to identify various devices, networks, or storage mediums on the system 240. A marker 282 may be used to establish filters for search queries, sorting data, and identifying specific data from media content sources. A marker 282 may be used to assign media content, media contextual data, ranked contextual data, and other information rendered 278 based in an electronic queue of for presentation from various media sources 243.

The API 260 (which may be the same as or similar to the API 210) may be used to initiate a web chat, video conference, or video phone application using the presentation device 209 and camera 114 with applicable programming. The API 260 may be used to initiate a login sequence on a web service 229, media aggregator 230, or EPG 225 that connects and synchronizes the presentation device 209 to the media selection 202 and activities of other users of those systems. For example, the API 260 may be used to manage a login sequence to a social network 253 that enables media content and information to be sent automatically to the presentation device. The API 260 (and API 210) may be used to manage downloaded program applications that remotely operate devices on the system 240. The API 260 (and API 210) may be used in conjunction with the data manager 240 to establish and manage an electronic queue, content filters, and presentation schedule for media content presentations in accordance with user preference settings. In one embodiment, the API 260 (and API 210) may be downloaded by a computer 252, members of a social network 253, or a mobile device 254 to identify and share media content 242 using media experience data 259. In another embodiment, media experience data 259 and ranked contextual data 268 derived from a social network 253 may be compared and shared based on the sender's choices of media content 242 to be presented. For example, if three members of a social network send similar media content on the system, each may receive a ranking of their selection compared to the others based on the connectedness data values rendered by media experience data analysis and ranked contextual data analysis, and data rendering results. In another embodiment, a program may automatically analyze media that is stored, viewed, downloaded, shared, or created on a device and compare the media contextual data to media connectedness values associated with a user profile. If the media connectedness values meet a threshold or benchmark, an audio visual or vibrating alert may be sent to a single users and/or the social network.

The system 240 may enable comparative analysis of media 242 from various media content sources 243 to establish a rating or ranking based on connectedness data values rendered by media experience data analysis and ranked contextual data analysis, and data rendering results. In one embodiment, users of these various media sources 243 may participate in a reward-based virtual game for sharing media ranked and rated using connectedness data values, by volume, highest value measurements, time based measurements, number of participants, most presented, and any combination of the like. For example, a single or group of remote users 253 of the system 240 may submit multimedia content 243 such as video clips or images to be presented to a subject whom, based on the analysis and presentation of ranked and rated connectedness data, will reveal to the remote group which of the content submissions was more or less favorable, desirable, studied, analyzed, and the like. In another example, multimedia content 243 may be presented to a subject wherein the subject's behavioral data is measured along with spontaneous comments and speech about the content that is simultaneously time stamped, recorded, transcribed, logged, and ultimately distributed to members of a social network 253.

Figure 3:
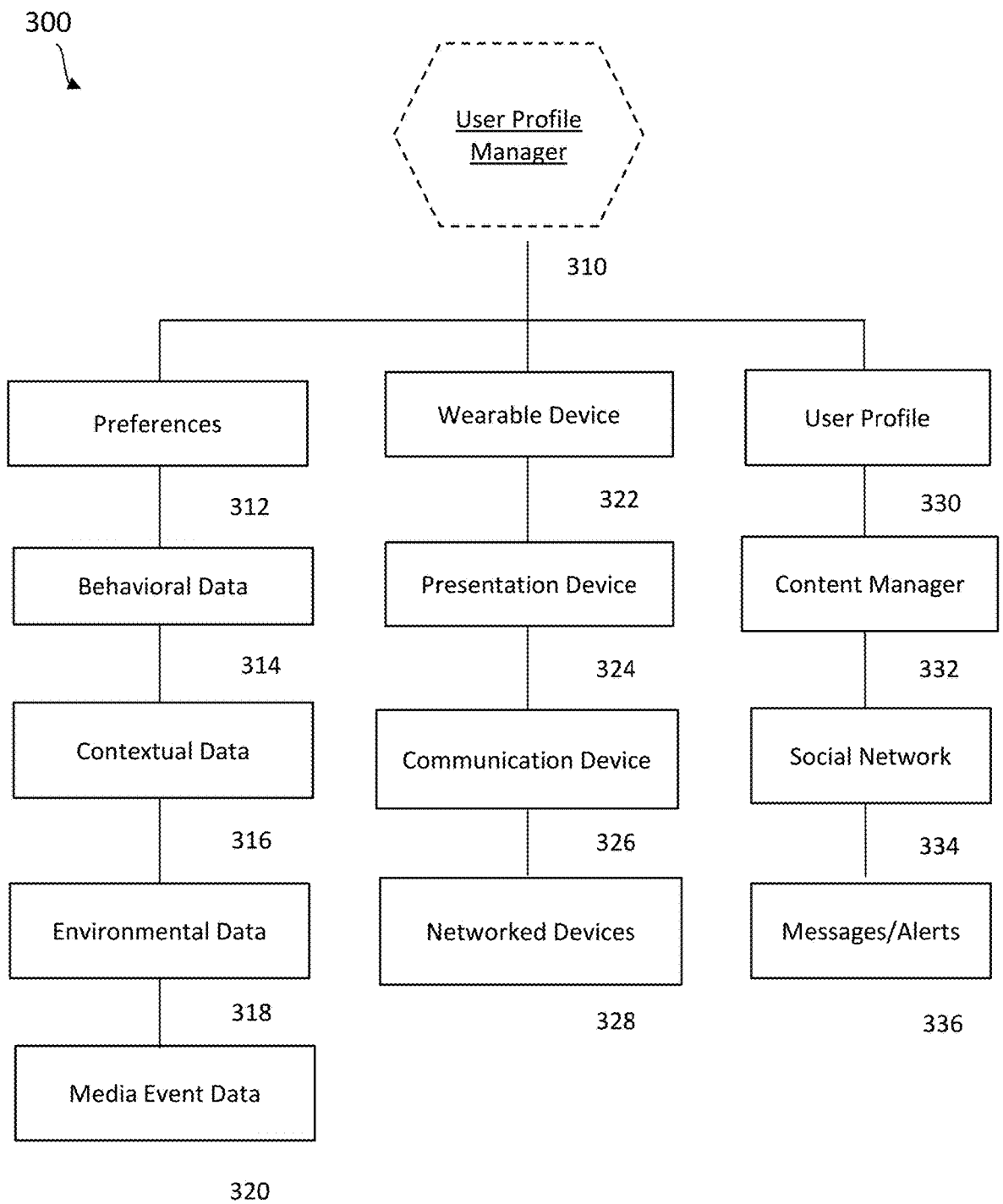
FIG. 3 shows a generalized embodiment of exemplary data associated with a subject's user profile including attributes associated with a system for managing media experience data according to one embodiment of the present disclosure.

FIG. 3 is a graphical depiction of a data associated with a user profile in a user profile manager 310 that is used for managing the media content and device activities associated with the subject 116. The user profile manager 310 can be part of a telemetry system or similar system functioning on a network 110 or a communication device 130. The user profile manager 310 may identify, assign, analyze and associate data or data sets from various components and programming in the system 110. Data may include preference data 312, behavioral data 314, contextual data 316, experiential data 318, and media event data 320.

The user profile manager 310 may be used to manage content, content filters, preference data, and analyzed data with various components of the system including a wearable device 322, a presentation device 324, and a communication device 326; the devices may comprise a network 328 associated with the subject 116. The user profile manager 310 may be used to assign a unique identity, network administrator, and preferences associated with the subject by maintaining a user profile 330. The user profile manager 310 may manage preferences for search queries or presented media with a content manager 332. The content manager 332 may utilize the data aggregator 260 and data analysis block 226 to identify, sort, and direct media from web services 229 or 244, or media aggregator 230. The user profile manager 310 may manage access to and content flow with a social network manager 334. Content may be shared, transferred, or presented on an automated or request basis with devices and users of the system. The user profile manager 310 may create settings and schedules for information exchanges between devices on the system, for example new user activity, new content availability, search results, updates, countdowns, media event results, activity thresholds and benchmarks with a message/alert manager 336. In one embodiment, preference data 312 may be used to create parameters for presenting media including but not limited to device type, favorite content, favorite television program, favorite artist/celebrity, time of day, type of device, location, length of program, and/or sleep periods (of inactivity).

FIG. 4-A is a graphical depiction of a system for capturing and analysis of facial expressions, facial features, emotions, attention level, physical movement, physical objects and speech audio as described previously in FIG. 1. A system 400 is shown in which at least one camera 402 observes a subject 116 and analyzes data that indicates media connectedness. In some embodiments, the camera 402 is coupled to at least one microphone 403. The subject 116 may be human or non-human such as a pet animal kept in a home. In some embodiments, facial analytics data 406 may be represented by actions and changes to the upper body, the head, the face or a combination therein that may be observed, identified, tracked, measured, processed, analyzed and interpreted in real time. In some embodiments, the system 400 may operate computer vision applications coupled to machine learning and artificial intelligence programs such as those described further in FIGS. 8B and 10. In some examples, machine learning and artificial intelligence programs collect, measure and interpret a subject's 116 facial analytics 406 using captured human attributes and facial features such as mapping facial contours and landscapes to: identify a face; determine a subject's 116 identity; identify facial expressions associated with a subject 116; determine a subject's 116 emotional state; determine a subject's 116 attention level; track a subject's 116 head movement; track a subject's eye movement and gaze; track a subject's eyebrow movement; and track a subject's mouth and lip movement. In some examples, the system 400 may be coupled to computer vision applications that enable a subject's 116 human attributes and facial features to be associated with a user account 330. In still other examples, the system 400 may be coupled to machine learning and artificial intelligence programs that approximately identify and measure a subject's 116 human attributes and facial features using facial landmarks, features and dimensions in addition to hair, eyes, size, height, race, age and the like, without associating collected data with a user account 330, but rather so that may be collected anonymously and assigned to a generic user profile for use by the system 400. In some embodiments, audio 407 may be recorded with a recording device coupled to camera 402, such as at least one microphone 403. In some other embodiments, microphone 403 may be coupled to speech recognition applications that: detect human speech from a subject 116; detect audible utterances from a subject 116; detects ambient sounds from the viewing environment; detects voice commands that operate system 400 components and software; and determine a subject's 116 emotion and attention level before, during and after a media presentation using the subject's 116 language including words, sequence, volume, frequency and the like. In some embodiments, the system 400 may operate machine learning and artificial intelligence programs to collect, measure and interpret a subject's 116 physical status and movements. In some examples, physical movement 408 may include a hand gesture, standing, sitting, and the like. In some embodiments, the system 400 may operate machine learning and artificial intelligence programs to identify and label physical objects visible proximate to a subject's 116 position in a media viewing setting. In some examples, objects may include a person, animal, furniture, light fixtures, handheld devices, media appliance, clothing, books, environment features such as residential, commercial space or outdoor setting, and the like. In some embodiments, the system 400 may operate machine learning and artificial intelligence programs to identify and label environmental conditions associated with a subject's 116 media viewing setting such as light level, indoor or outdoor setting, mobile or stationary status, device position and orientation, GPS location, and the like. The camera 402 may be attached to or embedded in a presentation device 410. In some embodiments, presentation device 410 is a stationary such as a computer monitor coupled to a camera, networked television with embedded camera, surveillance camera coupled to a monitor, and the like. In other embodiments, presentation device 410 is portable such as a smartphone, tablet, laptop, wearable device with embedded camera, and the like.

FIG. 4-B is a block diagram that schematically shows the system 420 for capturing and processing a subject's 116 facial identities, facial expressions, emotions, attention levels, speech, audio hand and body movements that indicate media connectedness as described previously in FIG. 4-A. The system 420 may be attached to or embedded in a device managed by a communication interface 422 and operated in accordance with programmed or downloaded instructions. The system 420 may include a lens 424, an infrared (IR) illuminator 425, one or more video sensors 426, an ambient light sensor 427, and a motion detection module 428 to detect and measure a change in orientation or movement within a visible field. The IR illuminator 425 may enable video capture in low light or darkness. The ambient light sensor 427 may allow the video sensors 426 to adjust to low light. The motion detection module 428 may process data input from a single or combination of video sensors 426 to interpret depth, range, and physical activity. In some embodiments, system 420 components collectively operate to determine a subject's 116 facial identity, facial expressions, emotions, attention level, eye movement and gaze, head movement, hand and body movements, body position as well as recognize objects and environmental conditions. In some examples, a facial expression may be a smile, smirk, frown, lip raise, lip press, lip pucker, nose wrinkle, mouth open, chin raise, brow furrow, eyebrow raise, closed eyes, laugh, and the like. In other examples facial expressions or combinations therein may indicate an emotional state such as happy, sad, angry, fear, confused, frustrated, surprised, contempt, disgust, awed, appalled, and various combinations of emotional states. In some examples, In some other examples facial expressions, physical attributes and movements or combinations therein (such as eye gaze, body position, and head movement) may indicate a subject's attention level during media presentations. In still other examples, hand and body movements may include a wave, hand clap, pointing, laughing, standing, sitting, laying, walking, and the like. In some embodiments, system 420 components collectively operate to recognize objects within the viewing range of the lens 424. In some examples, system 420 may identify objects of interest in the view range and assign a class label or identification for use by the subject 116 and system 420. In one embodiment, the system 420 may initiate a command based on a change in lighting detected by the ambient light sensor 427 such as sending a message alert to a device on the system 420 or a social network group, video or audio program playback, video recording, presentation of media content stored in a queue, and the like.

The system 420 includes a processing unit (central processing unit, CPU or processor) 430, a graphics processing unit (GPU) 431 and a system bus 432 that couples various system components including the system memory 434, such as read only memory (ROM) 436 and random access memory (RAM) 437, to the processor 430. The processor 430 may utilize a non-volatile or volatile flash memory 434 for temporary storage. The system 420 can include a cache 438 of high-speed memory connected directly with, in close proximity to, or integrated as part of the processor 430. The system 420 can copy data from the memory 434 and/or the storage device 440 to the cache 438 for quick access by the processor 430. In this way, the cache 438 can provide a performance boost that avoids processor 430 delays while waiting for data. These and other modules can control or be configured to control the processor 430 and GPU 431 to perform various actions such as capturing video, analyze video and picture images, facial detection programming, collecting sensor data, operating television infrared remote control signals, playing a video file, web browsing, music and audio playback, image and picture presentation, reading an audio book, executing an automated media content search on a database, managing social media access, and the like. The processor 430 and GPU 431 can include any general purpose processor or a special-purpose processor with instructions that are incorporated into the actual processor design such as a hardware module (1) 442 and a software module (2) 444 stored in storage device 440, configured to control the processor 430. The processor 430 and GPU 431 may operate according to instructions derived from an activity and expression detection program 448 for identifying gestures and facial expressions, a media data program 449 that analyzes media and media contextual data, or biometric program 450 that interprets biometric and physiological sensor activity. The processor 430 may process data using a USB FIFO unit 452 and USB Controller 454. The USB FIFO unit 452 acts as a buffer between various components that supply data to the USB Controller 454 that manages data flow. An advanced high performance bus module 432 may also be used to carry data from the system 420 to other communication devices using a communication module 456. The communication module 456 may be configured for wired or wireless connections including USB, Wi-Fi, Bluetooth, HDMI, cellular data network and the like.

The system 420 may have an LED light 460 that emits multicolor signals. The system 420 may include a clock 461 that is used to determine the schedule for automated functions and communications between devices on the system 420. The system 420 may include at least one microphone 462. Audio signals captured by the microphone 462 are digitized by an analog to digital converter 463. The audio signals may be processed in accordance with program instructions provided by an audio detection module 464. In some other embodiments, microphone 462 and audio detection module 464 may be coupled to speech recognition applications that: detect and identify human speech from a specific subject 116; detect and identify ambient sounds from the viewing environment; and detect, interpret and convert voice commands that operate system 400 components and software. The system 420 may include passive heat exchangers 465 for reducing heat inside the device such as a fan, heat sinks, heat pipes, heat spreaders, thermoelectric coolers (TECs), and the like. The system 420 may have a proximity sensor 466 to detect other devices within a detectable range. The system may have a data port 467 for external memory input. The system 420 may have an infra-red communication module 468 for remote operation of devices controlled with infra-red controlled functions. The infrared (IR) module 468 is comprised of a digital/IR signal converter 470, a decoder 472, a microcontroller 474, an IR transmitter and receiver 476, port for external IR input/output sensor 478, IR emitter sensor 480, program instructions, and program code for learning IR remote commands. In one embodiment the IR module 468 transmits and receives data over a network to communication devices included program instructions, and remote control commands including input source change, channel change, volume change, mute on/off, channel list, closed captioning functions, viewing aspect ratio, system modes/settings menu, and activity status of the television including power on/off and display of program information. The processor 430 may essentially be a completely self-contained computing system, containing multiple cores or processors, a bus, memory controller, cache, etc. A multi-core processor may be symmetric or asymmetric.

FIG. 5-A Is a graphical depiction of a system 500 for capturing physical and physiological data. A system 500 is shown which identifies, records, and measures a subject's physical movements and biometric responses 501 that indicate media connectedness. A subject 502 may be a person or an animal that is evaluated. The system 500 may include a presentation device 503 and a wearable device 504.

FIG. 5-B is a diagram of the generalized embodiment of a presentation 505 device that may be used to implement a system 500 for collecting, analyzing and sharing media connectedness data. The presentation device 505 may have a central processing unit 506, a Read Only Memory (ROM) 507, Random Access Memory (RAM) 508, and at least one cache 509 to temporarily store data and improve processing efficiency. The presentation device 505 may have a user interface 536 to manually control device functions. The presentation device 505 may have a graphics processing unit (GPU) 510 and a video encoder/video codec 511 (coder/decoder) to process high resolution graphic data and present on a display 512. The presentation device 505 may have an audio processing unit 513 and an audio codec 514 for processing and broadcasting high fidelity stereophonic audio to an audio port or external audio speakers 515. The presentation device 505 may include at least one embedded video camera 516 and microphone 517 for capturing audio visual content from the subject 116 or surrounding environment. In some embodiments, the microphone 517 may be used to capture audio including audible speech, voice activated speech, voice commands, and ambient sounds. The presentation device 505 may include an I/O controller 518, network interface controller 519, memory controller 520, and system memory 521, logic module 522, network interface 523, analog to digital module 524, and wireless communications adapter 525. The I/O controller 518 may manage data input and output to and from the presentation device 505. The logic module 522 may manage automated functions of the device. The network interface 523 may manage connections between the presentation device 505 and a network. In some examples, a network may be local, internet based, cable, satellite, cellular and the like. The memory controller 520 manages data to and from the presentation device 505 memory 521. The system memory 521, ROM 507, RAM 508, and cache 509 may store application program data and operation commands. The analog to digital module 524 may convert analog signals into digital data. The wireless communications adapter 525 may operate with the network interface 523 to enable wireless access to a network (e.g., private network, local network, or internet) and may include any of a variety of various wired or wireless components including Bluetooth, BLE, WiMax, Wi-Fi, ZigBee and the like.

The presentation device 505 may include a clock 526 that is used to determine the schedule for automated functions and system 500 communications between devices and presentation device 505 functions. The GPU 510, central processing unit 506, network interface controller 519 and various other components of the presentation device 505 are interconnected via one or more buses 527, including serial and parallel buses, a memory bus, a peripheral bus, and a processor or local bus using a variety of bus architectures. In one or more embodiments, the presentation device 505 may be a smart phone, smart television, cell phone, computer, computer tablet, laptop computer, or video monitor. In one embodiment, the presentation device 505 may include a computer program application embodied in a non-transitory computer readable medium for converting text to speech in an audio broadcast. The computer program application may include code for reading alphanumeric character text and information, code for converting text to speech, and code for rending an audible broadcast of the converted text. For example, if a news article from a web site is sent to a presentation device 505, the information may be read via audio broadcast to a viewer with a wearable device 504 in accordance with user profile preference settings. In another embodiment, an image and accompanying text message describing the image may be sent to a presentation device 505, and the system 500 will present the audio and visual information simultaneously in accordance with user profile preference settings. For example, a user of system 500 may create an image with media device, such as a photo from a smartphone camera, wherein the system 500 enables the user to create an audio description that is coupled to the image file such that they both may be presented simultaneously by the presentation device 505. In a further embodiment, the presentation device 505, upon receipt of information or media content data delivered by the system 500, may initiate an audio visual alert to devices on the system 500 confirming receipt of the data. In yet a further embodiment, the presentation device 505 may use a clock 526 to synchronize with an electronic calendar that is managed by the system 500.

FIG. 5-C shows a wearable system 550 for collecting physical and physiological behavioral data that relates to media connectedness values. The system 550 may have a central processing unit (CPU or processor) 551, a Read Only Memory (ROM) 552, a Random Access Memory (RAM) 553, and at least one cache 554 to temporarily store data and improve processing efficiency. The processor 551 may utilize a non-volatile or volatile flash memory 555 for temporary storage. The system 550 may include an I/O controller 556, logic module 558, analog to digital module 559, USB FIFO unit 560, USB controller 561, clock 562, graphic processing unit 564, video codec 565, wireless communications module 566, and network interface 567. The CPU 551 and various other components of the wearable system 550 are interconnected via one or more buses 578, including serial and parallel buses, a memory bus, a peripheral bus, and a processor or local bus using a variety of bus architectures. The I/O controller 556 may manage data input and output to and from the system 550. The logic module 558 may manage automated functions of the system 550. The analog to digital module 559 may convert analog signals into digital data. The USB FIFO unit 560 acts as a buffer between various components that supply data to the USB controller 561 that manages data flow. The clock 562 may be used to determine the schedule for automated functions on the device and system 550 communications between devices. The network interface 567 may manage connections between the system 550 and a network. The wireless communications module 566 may operate to enable wireless access to other devices and/or a network (e.g. private network, wide area network, ISP, local network, internet) and may be any of a variety of various wired or wireless components including Bluetooth, BLE, IR, optical, WiMax, RFID, Wi-Fi and the like.

The wearable system 550 may include a user interface 568, display 570, ambient light sensor 572, vibration motor 573, microphone 574, and speakers 576. The user interface 568 may be used to manually control device functions. The display 570 may display video, graphics, images, pictures, alphanumeric characters, and the like. The microphone 574 may be used to capture audio including audible speech, voice activated speech, voice commands, and ambient sounds. The speakers 576 may be used to broadcast audio sent to the system 550 via stored file, file download, data packets, Internet streaming, wireless transmission via Bluetooth or WiFi and the like. The ambient light sensor 572 may be used detect changes in light intensity. The vibration motor 573 may be may be used in conjunction with message and alert functions of the system 550.

The wearable system 550 may include behavioral sensors 575 that detect physical and physiological data. Behavioral sensors 575 that measure physical and physiological information may be worn about the body of the subject including but not limited to a wrist, hand, waist, neck, chest, leg or head. The behavioral sensors 575 may include sensors for collecting physical data indicating horizontal and vertical movement, angular movement such as a multi-axis gyroscope 581. An accelerometer 583 sensor may be used to record the rate of movement activity and specific movement patterns. A proximity sensor 580 may be used to detect other devices within a specific range. In one embodiment, the gyroscope and accelerometer data may be analyzed to detect when the subject is asleep, awake, active, clapping, waving, or pointing. The behavior sensors 575 may include physiological sensors for collecting data indicating skin temperature, blood pressure, heart rate, galvanic, EEG, and other physiological responses. A photoplethysmographic sensor 582 may be used to monitor heart rate, blood pressure and oxygen levels. An electrochemical sensor 584 may be used to measure body fluids such as sweat, tears, and pH levels. A magnetometer (digital compass) 585 may define a geographical location and coordinate frame of reference oriented from the Earth's magnetic North pole. A digital temperature thermostat sensor 586 may be used to detect skin temperatures. A Global Positioning System (GPS) receiver 587 can provide the location of the system 550 and define waypoint coordinates. A pressure sensor 588 may be used to detect torsion, bending, or vibrations. An electroencephalogram (EEG) sensor 589 may detect electrical activity in the brain via electrical impulses. An audio recorder 590 may be used to record audio from the subject wearing the system 550. In one embodiment, an automated program function may sample readings from various sensors in to properly calibrate and determine measure accuracy.

The system 550 may use a microphone 574 in conjunction with an audio recorder 590 to enable a program that transcribes voice to text, a program that enables voice activated recording during media content presentations, voice based text messaging, and/or voice activated commands that control functions on the system 550. In another embodiment, the microphone 574 and speaker 576 may also be used in connection with applications for video chat and video conferencing. In yet another embodiment, the proximity sensor 580 may initiate an audio visual alert through the display 570 and/or speaker 576 indicating the system 550 is in or out of range of another device. In yet a further embodiment, the system 550 with a display 570 may confirm receipt of a message, request or alert signal with activation of the vibration motor 573 and/or signal from the speakers 576. Similarly, the system 550 may receive an audio, vibrating, or visual alert confirming (search application) discovery, delivery and/or presentation of media content, text information, or media content data that has been sent from other devices or user accounts with access to the system 550. The vibrating, audio, or visual alert may vary in degree of intensity based upon the degree of media connectedness of the purposed media selection. In still yet a further embodiment, the system 550 may receive time sensitive data, alerts, or messages from devices synchronized with the clock 562 and an electronic calendar managed on a network. For example, the wearable device may receive a countdown timer oriented message indicating the schedule or time of a media presentation, web chat, or other information on the system 550.

The system 550 may have a wireless charging receiver 592 compatible with a rechargeable battery. The wireless charging receiver 592 may use resonant circuits for inductive power transmission. The wireless charging receiver 592 may include communications and control unit 593, converter 594, rectifier 595, and modulator 596. The communications and control unit 593 regulates the transferred power to the level that is appropriate for the components of the system 550. The converter 594 converts transferred power into the required DC voltage. In one embodiment, the wireless charging receiver 592 may deliver functional data to the I/O controller 556 and display 570 including power levels, charging status, low power indication, and recharge time. In another embodiment, the system 550 may have a data/power port 598. In some examples, data/power port 598 may used for hardwire recharging. In other examples, data/power port 598 may be used for transferring data to an external device including but not limited to biometric data, system data, and device function related data. In a further embodiment, the wireless charging receiver activity and functions may be triggered by a specific biometric data profile comprised of a single or combination of behavioral sensor 575 data measurements, e.g.; the subject is asleep or in a resting status.

FIG. 6-A is a graphical depiction of a system 600 for capturing experiential data 602. The system 600 may include a presentation device 604, a camera 606, and a wearable device 608. Experiential data 602 may include data that is captured, measured, and referenced by system 600 in order to enhance understanding, definition, or clarity of collected behavioral data 610. In some embodiments, behavioral data 610 includes but is not limited to time of day, device types, media event locations, duration of media events, frequency of media events, device interactivity, media content source, media delivery channel or network, user interactivity and the like. Behavioral data 610 may include physical and physiological data captured by handheld presentation devices 604, camera 606, and wearable device 608 sensors that collect data from a subject 116 including but not limited to a face, body, wrist, hand, waist, neck, chest, leg or head. Behavioral data 610 sensors may collect physical data indicating horizontal and vertical movement, angular movement with a multi-axis gyroscope and/or an accelerometer. Behavioral data 610 sensors may collect physiological data indicating skin temperature, blood pressure, heart rate, galvanic, and other physiological responses.

FIG. 6-B illustrates conditions, elements, attributes and circumstances that may represent experiential data 622 and impact connectedness data values between a subject 116 and presented media before, during, and after a media presentation 620. Data measurements and analysis 628 may be conducted to determine the influence of experiential data 622 on media connectedness data values derived from a media presentation 620; these values are rendered as media experience data or media event data 634. Media event data 634 may include individual data, indices and/or a collective data set including media contextual data 624, behavioral data 626 and experiential data 622. Experiential data 622 may provide clarity, depth, contexts, and refinement to data analysis 628 that evaluates and renders media event data 634. Surrounding the experiential data 622 in FIG. 6-B is a non-exhaustive list of different types of measureable and quantifiable data that may indicate a range of preference values and elements that may impact the media presentation 620 outcome on connectedness data values and interpretations, attributes, inferences that may be applied to media contextual data 624 and behavioral data 626 respectively. Other sources of reference and historical information, such as a user profile 630, web service or electronic program guide 632 may be analyzed 628 to determine the accuracy and consistency of experiential data 622 values.

FIG. 7-A is a flowchart of a process 700 for processing and analyzing media event data that may be used to evaluate and measure media connectedness. The flow may begin with the process 700 using a user profile account data 702 to create an electronic identifier 704. The electronic identifier 704 may be used to define individual data, an index, a data set, or indices. The electronic identifier 704 may be associated by the user profile 702 with media contextual data 706, behavioral data (camera, device and wearable data) 708 and experiential data 710 to generate collective media experience data 714. The media experience data 714 may include data, a data point, an index, a data set, groups of data sets, or group of indices. The data processing 716 may occur in real time utilizing streaming data or take place once the media experience 714 collection concludes. The data processing 716 may aggregate, index, label, assign, synchronize, correlate, associate, compare, count, measure, or calculate the collective data to determine which portion therein will be presented as media event data 717.

The process 700 may use available analytical instructional data 718 stored in the user profile account to define, refine, add context to, and guide quantitative and qualitative evaluations, inferences, and interpretations of media event data as they relate to connectedness with the subject associated with the user profile. Analytical instructional data 718 may include a combination of preference data 720, content filter data 722 or evaluative parameter data 724. Preference data 720 may determine the priority, hierarchy, or qualifying standard for comparing and associating any or all indices identified in contextual data 706, behavioral data 708, or experiential data 710. Content filter data 722 may be used to determine the priority, hierarchy, or qualifying standard for screening or limiting any or all indices associated with media contextual data 706. Evaluative parameter data 724 may be used to guide or customize the process 700 regarding the method of analyzing information to affect a particular result. The process 700 may use a media connectedness analyzer 726 to further process and evaluate media event data 717 and media instructional data 718. The process may present the analysis results in a data rendering 728. A data rendering 728 may be presented in a variety of depictions including numerical value, chart, graph, percentage, ratio and the like. Data rendering 728 may also be identified as threshold or benchmark data 730 stored in the user profile 702 for reference, comparison, and evaluation of historical and potential connectedness values. In one embodiment, the data captured and analyzed by the system can be recorded into a standard relational database (e.g., SQL server or the like).

FIG. 7-B is a method 740 for assigning media connectedness data to a user profile. At 742 the user is presented with an option to review user profile data 744 or search for media content 746. If the user elects to search for profile data 744, once found, they may be presented with several categories of data related to media connectedness data values. In one example, method 740 may present media connectedness data values using category or subcategory names and labels for content, genres, artists, channels, etc. in various forms including lists, charts, most frequented, custom rankings, most recent, popular by demographic profile and the like. User profile data 744 can be used to set parameters for the search function 746. For example, if user profile information indicates that a specific media variety is preferred at certain times of the day, then the search function 746 may incorporate those parameters while surveying media content sources. Once a media selection is found, then at 748 the user is presented with an option to evaluate the media selection with connectedness analysis module 750 and store the media contextual data 752 or present the media 754. Once the media is presented, behavioral response data 756 is captured, synchronized with contextual data and experiential data 758, analyzed and evaluated 760. At 762, the user is then presented with the option to add the media experience data to the user profile or return to the initial search mode.

FIG. 8-A depicts a model 800 of dependencies which may be used to determine, infer, and/or interpret connectedness values between a subject and presented media using collected media experience data. In the model of FIG. 8-A, connectedness values may be generally characterized in a correlation between data plots on axis ranges based on like/dislike and preferred/not preferred. The model 800 may include collecting media experience data before, during, and after a media selection presentation to represent media event data 802. A media event data set 802 may include physical and physiological data captured from a presentation device 808, wearable device 810, camera 812, media contextual data 814, and experiential data 816. In some embodiments, presentation device 808 is presentation device 112. In some embodiments, wearable device 810 is wearable device 120. In some embodiments, camera 812 is camera 114. In some embodiments, media contextual data 814 is media contextual data 108. In some embodiments, experiential data 816 is experiential data 118. In some embodiments, presentation device 808 may capture physical and physiological information which may include one or more data measurements of body movement, hand movement, location, elevation, mobility, temperature, light level, audible sounds, haptic gestures, facial expressions, emotions, attention levels, eye movement, eyebrow movement, head movement and mouth movement. The wearable device 810 may capture physiological information which may include one or more data measurements of heart rate, blood pressure, skin temperature, and perspiration. The wearable device 810 may capture physical information which may include one or more data measurements of body movement, hand movement, audible sounds, and haptic gestures. The camera 812 may capture physical information which may include one or more data measurements of head movement, body movement, hand movement, facial expressions, eye movement, mouth movement, and audible sounds. For example, each media experience may create a unique media event data 802 plot which represents a connectedness value including collected data (presentation device 808, wearable device data 810, camera data 812, media contextual data 814, and experiential data 816).

In one embodiment, baseline data measurements are determined using an algorithmic computerized learning program. For example, media event data 802 plotted at X-2 has the highest evaluation and the media event plotted at X-3 may have the lowest evaluation into a known baseline or norm. Baselines and norms may change over time as more and more data is acquired that refines the correlation of connectedness values to a particular subject 116 and specific media experience 802. A range of values measured on a continuum between "Like" or "dislike" and "preferred" or "not preferred" may be distinguished based upon one or more measurements of intensity, degree, variance, and frequency of the captured physiological and physical and this data correlation to experiential and media contextual data.

FIG. 8-B depicts a flow diagram of the media connectedness value analysis 820. Analysis of media connectedness data may include any type of analysis including computation of means, standard deviations, correlations, comparisons, modes, data plots, statistical values, proportions, ratios, or percentages. The parameters that determine computational analysis methods may be standardized or vary depending on sufficient availability of data and the desired analysis outcomes. To improve analysis outcomes, methods for parameter input may be initiated by human means or computerized applications such as machine learning or artificial intelligence programs. The flow may begin with collecting media experience data 822 associated with an electronic user profile. Analyzing media experience data 822 may include data measurement 824, data interpretation 826, and data inference 828 of connectedness values that reflect variations of a subject's 116 preference for or against a presented media selection, and reflect variations of a subject's like or dislike of a presented media selection.

The flow 820 may include developing data baseline 830 and norms 832 using collected media experience data 822 including physical and physiological data captured from a presentation device 808, wearable device 810, camera 812, media contextual data 814, and experiential data 816. Data baselines 830 and norms 832 may be established to optimize one or more methods that include the media connectedness value analysis 836 process. Data baselines 830 and norms 832 may be developed for media connectedness values based on calculations or may be based on historical connectedness values associated with a particular media selection or subject 116 viewing the presented media selection. Data baselines 830 and norms 832 may be developed with human input based on familiarity with the subject's media tastes, preferences, and lifestyle. In some embodiments, human input may include audible or texted based communications using presentation device 808 and/or wearable device 810 controls and interface for entering alphanumeric characters and processing audible device or software operation commands. In some examples, human input may be represented as a media preference list, media attribute preferences, viewing preference conditions, device preference, location, viewing audience, and the like.

The flow 820 may include determining the probability analysis 840 of connectedness between a subject and media they have already experienced or have never experienced. Using a proposed media module 844, the contextual data of a proposed media selection is processed in conjunction with a probability analysis 840 of one or more of the available media experience data categories to attribute predictions and/or forecasts of connectedness values of a subject to the proposed media selection. The proposed media module 844 and probability analysis 840 may compare and measure historical media experience user profile data 822 with the proposed media selection data using a combination of machine learning, artificial intelligence and/or algorithmic calculation programs. The flow 820 may generate an analysis rendering 846 in various depictions of connectedness values.

Connectedness analysis 836 and analysis rendering 846 may be used by computerized search programs 850 to locate media content 852 stored on local or remote servers, web services, media content aggregators, and the like. Once identified, the proposed media selection contextual data 814 may be evaluated, rated and ranked 854 with a combination of machine learning, artificial intelligence and/or algorithmic calculation programs that compare and measure data to determine comparative order and position based on specific attributes and or parameters related to media connectedness values. Based on the search parameter inputs and one or more of connectedness analysis 836, and probability analysis 840, rating and rankings analysis 854, recommendation rendering 856 may be provided for specific media selections in relation to connectedness data values. These steps may also contribute to establishing data benchmarks, filters, qualifiers, and thresholds using a computerized learning program or developed with human input, based on familiarity with the subject's media tastes, preferences, and lifestyle. Recommendation renderings 856 may be provided to an individual subject, a group of users on a social network, a web service, media aggregator, or a computerized search program in a variety of depictions including numerical value, chart, graph, percentage, ratio and the like.

To help clarify the best circumstances for a presentation to a particular subject 116, the probability analysis 840 may use an optimal conditions module 860 to establish a baseline and thresholds for ideal circumstances for presenting media to a subject. The optimal conditions module 858 may analyze presentation device 808, wearable device 810, camera 812, and experiential data 816 that is available when the proposed media selection data is evaluated. Based on probability analysis 840 results and a combination of machine learning, artificial intelligence and/or algorithmic calculation programs, the optimal conditions module 860 may recommend the best conditions or parameters for presenting the proposed media based on such factors as the type of media, time of day, device type, subject matter, and the like. Methods for establishing probability analysis 840 parameters and thresholds may be input by human means or established by computerized learning program applications. For example, if the proposed media selection is a news program presented in the morning hours and the subject's media experience profile indicates a preference to show news programming in the evening hours, the proposed media selection will be delivered to a queue for presentation during the evening hours.

FIG. 9-A Illustrates an example implementation of a system 900 for remote access management of media experience data over a communications channel. In the example shown, a communication device 902 may use an application program interface (API) 904 to access a communications channel 906 and manage communications sessions 908 between a server network 910, a presentation device 912, and other devices with network connectivity. A communication device 902 may be a computer, cell phone, smart phone, tablet, laptop and the like. The server network 910 may be a server farm, cloud-based network, multi-layered distributed architecture, edge computing infrastructure, or the like. The presentation device 912 may have similar functions as a communications device 902 and may include the technical means that enables the capture of media experience data that indicates media connectedness, such as a camera for capturing facial expressions and means for wireless communications with a wearable device that captures physical and physiological behavioral data. The communications channel 906 can be a Universal Serial Bus (USB), Ethernet, a wireless link (e.g., Wi-Fi, WiMax, 4G), an optical link, infrared link, FireWire, or any other known communications channel or media.

In one embodiment, a security process 914 may be used to secure communications sessions 908. A security process 914 may use a cryptographic protocol, such as Secure Sockets Layer (SSL) or Transport Layer Security (TSL) to provide a secure connection between a communications device 902 and a server network 910, and a presentation device 912. The system 900 may include a daemon program 916 that works with the API 904 to manage the communication sessions 908, including the transmission of commands and data, over the communications channel 906 and server network 910. The API 904 may support a client program 918 that operates on communication devices 902 and presentation devices 912 and provides a set of functions, procedures, commands, and data structures for supporting communication sessions 908 between devices operating on the communications channel 906. The client program 918 may operate using the user interface of devices on the system 900. The client program 918 may allow a user to download or update files, software, search databases for media, store user data, select services, browse web services, locate media content, manage device settings, initiate a web chat, set up preference parameters, set up data thresholds and benchmarks, set up user profiles, remotely operate a device on the network, conduct a data survey, perform financial transactions, and engage an online service or function.

FIG. 9-B Illustrates an example process 930 for managing and presenting media connectedness data on a computing device. The process 930 begins with presenting a first page 934 of user interface elements 936 on the display of a computing device 938. The computing device 938 may be a mobile phone, smart phone, tablet, laptop computer, or desktop computer. The user interface elements 936 may include display objects 940 and/or an application menu 942. In one embodiment, the user interface may be controlled using touch-sensitive controls. In another embodiment, the user interface may be controlled using computer peripheral hardware, such as a mouse and alphanumeric keyboard. Objects 940 displayed may be graphics, pictures, photos, text, icons, symbols or some type of image. Menu 942 displays may include navigation guides that direct the user to different user interface elements 936 and additional pages 934. The process 930 may have a menu format of individual pages 934 designated for but not limited to browsing media, sharing media, analyzing media connectedness values, managing devices, setting up media content filters, creating thresholds and benchmarks for media connectedness values, managing network access, assigning administrative rights to users and devices, assigning access rights to users and devices, managing social network communication access rights and parameters, interfacing with an electronic program guide, managing third-party information, sending text and voice messages, purchasing goods and services, accessing a social network, and managing subscription based media services.

Figure 10:
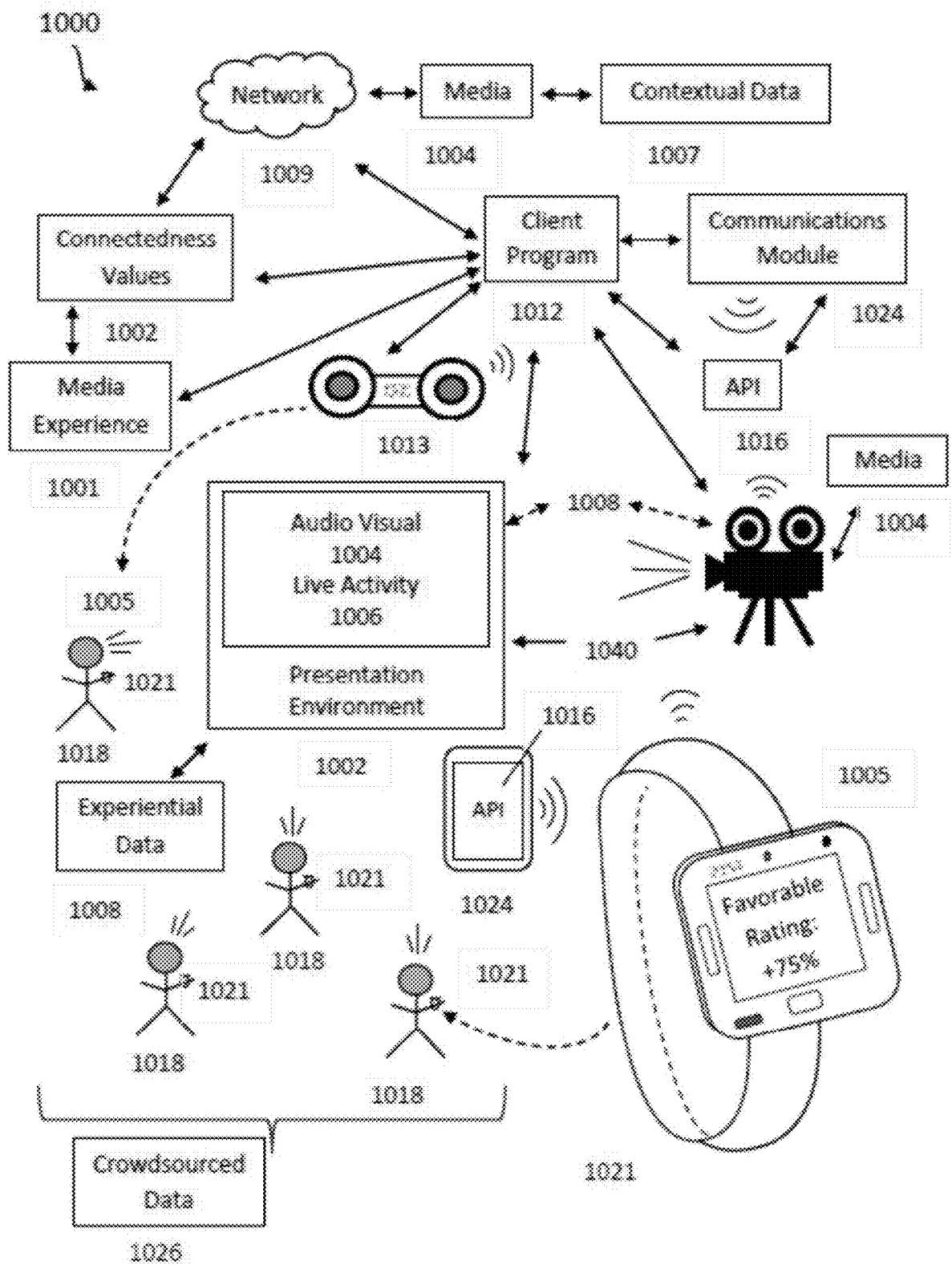
FIG. 10 illustrates an exemplary system for capturing and analyzing media experience data in a group or audience setting according to one embodiment of the present disclosure.

FIG. 10 illustrates an example implementation of a system 1000 for capturing and analysis of media experience data 1001 in a group or audience setting. The system 1000 may analyze the collected media experience data 1001 and render analyzed data results that indicate connectedness values 1002 for an audience or group of subject's 1018. In the example shown, the system 1000 may be comprised of one or more of the following: a network 1009, a client program 1012, an application program interface (API) 1016, a person or subject 1018, a communications module 1024, presentation device 1040, camera 1013, communications device 1024 and wearable device 1021. The system 1000 may operate in presentation environments 1002, including those designed for audio visual presentations 1004 and live activity 1006, that can accommodate a small group or large audience including but not limited to, for example, a movie theater, a cruise ship, a bus, an airplane, a playhouse, a sports stadium or arena, a concert hall for music, a comedy club, a church, a sports bar and the like.

The media experience data 1001, connectedness values 1002, network 1008, API 1016, communications device 1024 and wearable device 1021 may operate in accordance with the purpose, functions and features depicted in FIGS. 1-9 and the respective descriptions therein. Similarly to the systems described previously, in the present system 1000 media experience data 1001 may be comprised of behavioral data 1005 that is captured, measured, and collected from at least one camera 1013 and wearable device 1021; experiential data 1008 from the presentation environment 1002 including live venue activity 1006 and presentation device 1040; and contextual data 1007 derived from the media selection 1004. Live venue activity 1006 examples may include but are not limited to an athletic competition, an amusement park, a music concert, an art gallery, a play, a speech or oral presentation, a retail store or shopping center, and the like.

The communications module 1024 may enable a wireless ad-hoc network to connect system 1000 devices with the client program 1012, API 1016, and network 1009. Communications module components may include but not be limited to a signal parser; a node core; node table identifier, range finder, and connection storage; peer management code; database adapter; peer to peer hardware adapter; outbox thread; daemon service component for message management, and a broadcast receiver.

The camera 1013, client program 1012, and network 1009 may individually or collectively be operated or controlled by a multiple facial detection and recognition program in real time to identify, monitor, measure, and record behavioral data 1005. The camera 1013 may be equipped with a microphone. The client program 1012 may be comprised of computer application algorithms that use mathematical and matricial techniques to convert images into digital format for submission to processing and comparison routines. In one embodiment, the facial recognition components may use popular facial recognition techniques such as geometric, three-dimensional face recognition, photometric, Facial Action Coding System, or Principal Component Analysis (PCA) with Eigen faces derived from the covariance matrix of the probability distribution over the high-dimensional vector space of face images, Linear Discriminate Analysis, Elastic Bunch Graph Matching fisher face, the Hidden Markov model, and the neuronal motivated dynamic link matching, and the like. The client program 1012 may incorporate one or a combination of the aforementioned techniques to identify behavioral data 1005 including facial expressions, vocal expressions and bodily posture. This information can be organized, processed, collated, compared, and analyzed by the client program 1012 or a remote program connected to the network 1009. The behavioral data 1005 from the camera 1013 can be managed by the client program 1012 or network 1009 program independently or it can be synchronized with behavioral data 1005 from the wearable 1021. Behavioral data 1005 collected by the system 1000 devices can be analyzed, compared, calculated, measured, rendered and presented as media experience data 1001 and/or connectedness values by the client program 1012, API 1016 and/or network 1009 program and displayed on system devices 1000 with display capabilities including the communication device 1024, wearable 1021, and presentation device 1040.

In one embodiment, the presentation environment 1002 may be enable several hardwired connections between the system 1000 devices using a Universal Serial Bus (USB), Ethernet, an optical link, FireWire, Lightning or any other known power and/or data connector. For remote data access via a network 1009 to the client program 1012, communications module 1024, API 1016, and presentation device 1040 and other system 1000 devices operating within the presentation environment 1002, the communications module 1024, presentation devices 1040, cameras 1013, and wearable devices 1021 may include any of a variety of various wired or wireless components including Bluetooth, BLE, WiMax, Wi-Fi, ZigBee and the like. The communication module 1024 may operate based on commands from the client program 1012 to interact with, store subject 1018 and system 1000 data, manage information and data transfers between the network 1009, API 1016, and various components of the system 1000.

Media 1004 content may be delivered remotely via a network 1009 and/or locally by the presentation devices 1040. The presentation devices 1040 may be comprised of a variety of components operating to deliver media 1004 to a presentation environment 1002. Presentation devices 1040 may include but not be limited to a cable or satellite television system, a television/monitor connected to the internet, a video projector and widescreen formatted for display in a theater or large room, and the like. In one embodiment, the system 1000 may enable multiple subjects 1018 to subscribe, login, opt-in, or join a networked connection 1009 using independently or a combination of an API 1016, a communication device 1024, a wearable device 1021. The system 1000 may download or transfer commands, data, control inputs, software updates via a network 1009. The network 1009 connection to a client program 1012 allows for remote management of the system 1000 components including the wireless module 1024, camera 1013, presentation system 1040, and API 1016. The camera 1013 may be enabled with motion detection, facial recognition, infra-red and/or night vision technologies. The client program 1012 may enable the camera to capture random subjects 1018 in the presentation environment 1002 or synchronize wirelessly with wearable devices 1021 to identify specific subjects 1018. Wearable devices 1021 identified by the system 1000 may be periodically synchronized by the client program 1012 and API 1016 with the audio visual program 1004 or live activity 1006 to establish base line data readings, calibrate hardware, improve data measurement and the like to enable more efficient and accurate system 1000 operation, collection of behavioral data 1005, rendering of media experience data 1001 and connectedness values 1002.

The system 1000 may identify, monitor, measure, record, collect, analyze and store experiential data 1008 before, during and/or after an audio visual 1004 presentation or live activity 1006. Experiential data 1008 may include but not be limited to the number of subjects 1018 logged in to the system 1000 via communication device 1024, via wearable device 1021 and/or measured, counted, or estimated by the client program 1012 and/or the camera(s) 1013. In the present example, experiential data 1008 may include demographic data associated with a subject's 1018 use of user profile, a communication device 1024 and/or a wearable device 1021 that interacts with the system including GPS location, IP address, images, videos, social media connections, and the like. Experiential data 1008 may also include crowdsourced data 1026 that is actively solicited and/or passively solicited electronically from subjects 1018 and system 1000 devices. For example, at a random or specific point in time before, during and/or after a media 1004 presentation or live activity 1006, the system 1000 may read, capture, measure and analyze the behavioral data 1005 of the subjects 1018, communication device 1024 and wearable device 1021. Crowdsourced data 1026 include user profiles, user information, GPS location data, venue information, opinion surveys, advertisements, promotions, service or product offerings, rank or rating surveys, and the like. The system 1000 may utilize machine learning or artificial intelligence software in the client program 1012 to customize and refine crowdsourced data 1026 interaction and functions with specific subjects 1018 and or devices connected to the system 1000. For example, if an audience survey response reveals a demographic within the group from a specific geographic area, or users of a specific device type/platform, or preference for a particular type of food, the client program 1012 may refine or customize the ongoing and future interaction with that sub-group based on their previous response. This process may repeat in order to refine crowdsourced data 1026.

Figure 11:
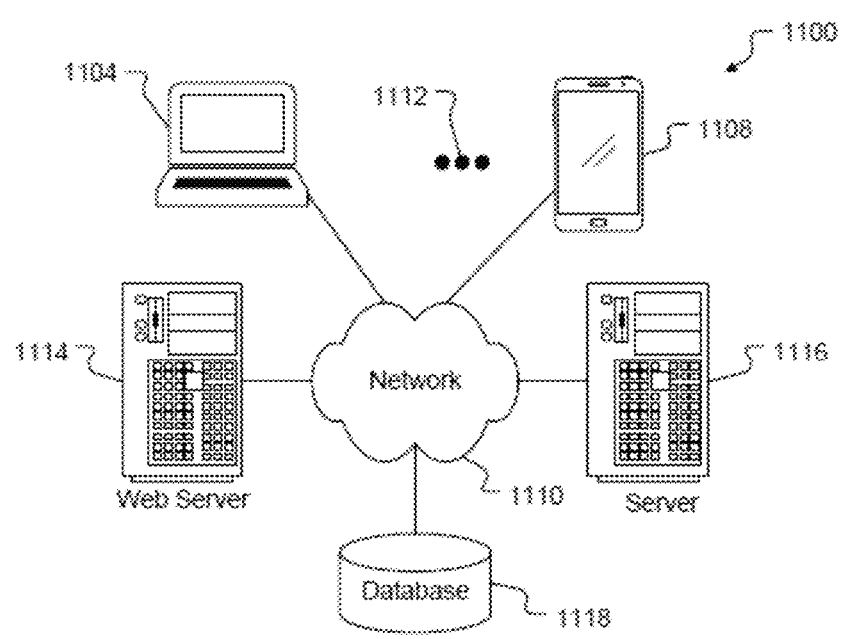
FIG. 11 is a block diagram illustrating elements of an exemplary computing environment in which embodiments of the present disclosure may be implemented.

FIG. 11 is a block diagram illustrating elements of an exemplary computing environment in which embodiments of the present disclosure may be implemented. More specifically, this example illustrates a computing environment 1100 that may function as the servers, user computers, or other systems provided and described herein. The environment 1100 includes one or more user computers, or computing devices, such as a computing device 1104, a communication device 1108, and/or more 1112. The computing devices 1104, 1108, 1112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 1104, 1108, 1112 may also have any of a variety of applications, including for example, database client and/or server applications, and web browser applications. Alternatively, the computing devices 1104, 1108, 1112 may be any other electronic device, such as a thin-client computer, Internet-enabled mobile telephone, and/or personal digital assistant, capable of communicating via a network 1110 and/or displaying and navigating web pages or other types of electronic documents. Although the exemplary computer environment 1100 is shown with two computing devices, any number of user computers or computing devices may be supported.

Environment 1100 further includes a network 1110. The network 1110 may can be any type of network familiar to those skilled in the art that can support data communications using any of a variety of commercially-available protocols, including without limitation SIP, TCP/IP, SNA, IPX, AppleTalk, and the like. Merely by way of example, the network 1110 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 1114, 1116. In this example, server 1114 is shown as a web server and server 1116 is shown as an application server. The web server 1114, which may be used to process requests for web pages or other electronic documents from computing devices 1104, 1108, 1112. The web server 1114 can be running an operating system including any of those discussed above, as well as any commercially-available server operating systems. The web server 1114 can also run a variety of server applications, including SIP (Session Initiation Protocol) servers, HTTP(s) servers, FTP servers, CGI servers, database servers, Java servers, and the like. In some instances, the web server 1114 may publish operations available operations as one or more web services.

The environment 1100 may also include one or more file and or/application servers 1116, which can, in addition to an operating system, include one or more applications accessible by a client running on one or more of the computing devices 1104, 1108, 1112. The server(s) 1116 and/or 1114 may be one or more general purpose computers capable of executing programs or scripts in response to the computing devices 1104, 1108, 1112. As one example, the server 1116, 1114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 116 may also include database servers, including without limitation those commercially available from Oracle®, Microsoft®, Sybase®, IBM® and the like, which can process requests from database clients running on a computing device 1104, 1108, 1112.

The web pages created by the server 1114 and/or 1116 may be forwarded to a computing device 1104, 1108, 1112 via a web (file) server 1114, 1116. Similarly, the web server 1114 may be able to receive web page requests, web services invocations, and/or input data from a computing device 1104, 1108, 1112 (e.g., a user computer, etc.) and can forward the web page requests and/or input data to the web (application) server 1116. In further embodiments, the server 1116 may function as a file server. Although for ease of description, FIG. 11 illustrates a separate web server 1114 and file/application server 1116, those skilled in the art will recognize that the functions described with respect to servers 1114, 1116 may be performed by a single server and/or a plurality of specialized servers, depending on implementation-specific needs and parameters. The computer systems 1104, 1108, 1112, web (file) server 1114 and/or web (application) server 1116 may function as the system, devices, or components described herein.

The environment 1100 may also include a database 1118. The database 1118 may reside in a variety of locations. By way of example, database 1118 may reside on a storage medium local to (and/or resident in) one or more of the computers 1104, 1108, 1112, 1114, 1116. Alternatively, it may be remote from any or all of the computers 1104, 1108, 1112, 1114, 1116, and in communication (e.g., via the network 110) with one or more of these. The database 1118 may reside in a storage-area network ("SAN") familiar to those skilled in the art. Similarly, any necessary files for performing the functions attributed to the computers 1104, 1108, 1112, 1114, 1116 may be stored locally on the respective computer and/or remotely, as appropriate. The database 1118 may be a relational database, such as Oracle 20i®, that is adapted to store, update, and retrieve data in response to SQL-formatted commands.

Figure 12:
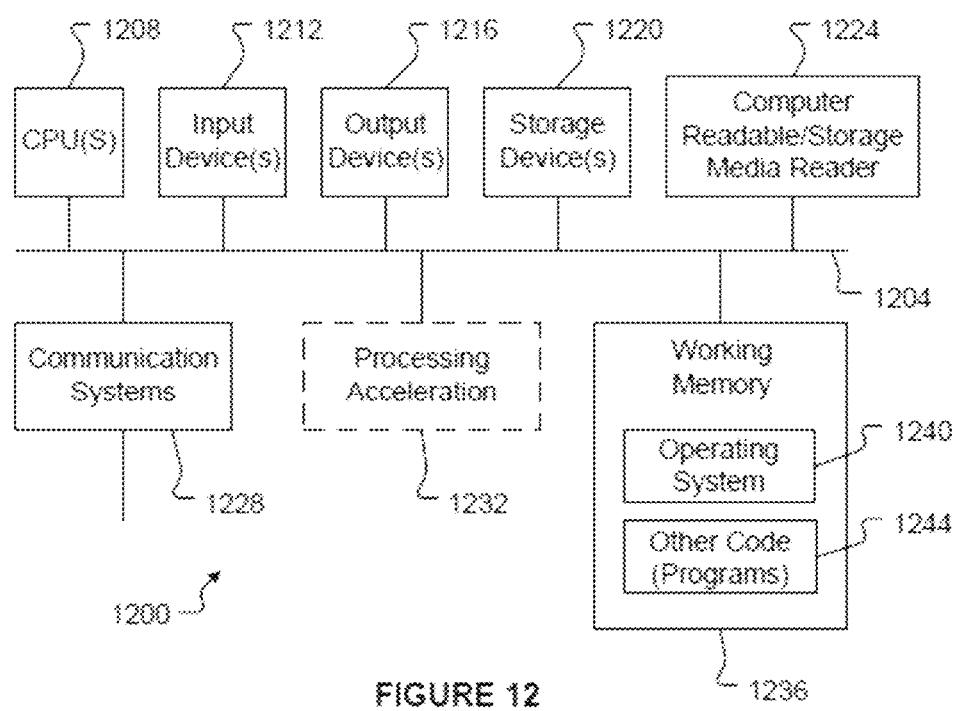
FIG. 12 is a block diagram illustrating elements of an exemplary computing device in which embodiments of the present disclosure may be implemented.

FIG. 12 is a block diagram illustrating elements of an exemplary computing device in which embodiments of the present disclosure may be implemented. More specifically, this example illustrates one embodiment of a computer system 1200 upon which the servers, user computers, computing devices, or other systems or components described above may be deployed or executed. The computer system 1200 is shown comprising hardware elements that may be electrically coupled via a bus 1204. The hardware elements may include one or more central processing units (CPUs) 1208; one or more input devices 1212 (e.g., a mouse, a keyboard, etc.); and one or more output devices 1216 (e.g., a display device, a printer, etc.). The computer system 1200 may also include one or more storage devices 1220. By way of example, storage device(s) 1220 may be disk drives, optical storage devices, solid-state storage devices such as a random access memory ("RAM") and/or a read-only memory ("ROM"), which can be programmable, flash-updateable and/or the like.

The computer system 1200 may additionally include a computer-readable storage media reader 1224; a communications system 1228 (e.g., a modem, a network card (wireless or wired), an infra-red communication device, etc.); and working memory 1236, which may include RAM and ROM devices as described above. The computer system 1200 may also include a processing acceleration unit 1232, which can include a DSP, a special-purpose processor, and/or the like.

The computer-readable storage media reader 1224 can further be connected to a computer-readable storage medium, together (and, optionally, in combination with storage device(s) 1220) comprehensively representing remote, local, fixed, and/or removable storage devices plus storage media for temporarily and/or more permanently containing computer-readable information. The communications system 1228 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 1200 may also comprise software elements, shown as being currently located within a working memory 1236, including an operating system 1240 and/or other code 1244. It should be appreciated that alternate embodiments of a computer system 1200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 13:
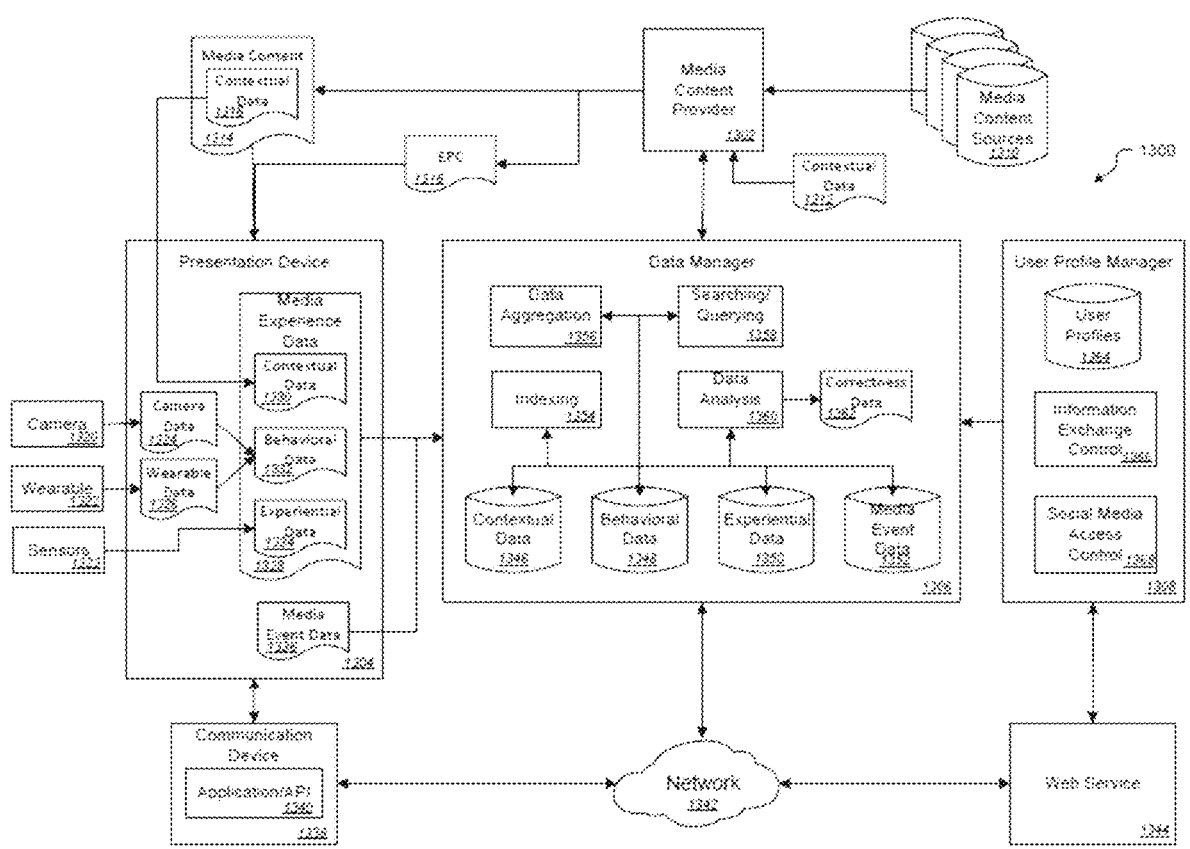
FIG. 13 is a block diagram illustrating an exemplary system for managing and delivering media according to one embodiment.

FIG. 13 is a block diagram illustrating an exemplary system for managing and delivering media according to one embodiment. As illustrated in this example, the system 1300 can comprise a media content provider system 1302, a presentation device 1304, a data manager system 1306, and a user profile manager system 1308. Generally speaking, the media content provider system 1302 can obtain media content from any of a variety of media content sources 1310. For example, the media content provider system 1302 and media content sources 1310 can comprise elements of one or more Content Distribution Networks (CDNs) as known in the art. The media content can comprise video, audio, text, multi-media, or other such content received from a media content provider over one or more wired or wireless networks such as the Internet or any one or more other local or wide area networks. The media content provider system 1302 can also obtain or create media contextual data 1312 as described above. The media contextual data 1312 can be associated with the obtained content from the media content sources and can identify and/or define the content. The media content provider system 1302 can then provide the media content 1314 and associated contextual data 1316 to the presentation device 1304.

The presentation device 1304 can receive and present the media content 1314 provided by the media content provider system 1302 as described above. Presenting the content can comprise, for example, displaying, playing out, projecting, or otherwise providing the content in a form through which the consumer may see, hear, or otherwise sense or experience the content. While the media content is being presented, input from one or more devices 1320 and 1322 can be received by the presentation device 1304. The input from the one or more devices 1320 and 1322 can indicate at least one physical or physiological condition of a consumer of the presented content while the content is being presented. For example, the one or more devices can comprise a camera 1320, a microphone, or a wearable device 1322 and the received input can comprise audio of the consumer from the microphone, video of the consumer from the camera 1320, or physiological information of the consumer from the wearable device 1322. In some cases, the wearable device 1322 may comprise a device capable of detecting brain waves and/or muscle movements or activity.

The received input from the one or more devices 1320 and 1322 can indicate a change in the physical or physiological condition of the consumer in reaction to the presented content. The change in the physical or physiological condition of the consumer can comprise one or more of a change of facial expression, a movement of the consumer's head, face, eyes, mouth, body, or hands, a spoken word, a sound, a vocalization, a change in heart rate, a change in respiration, a change in skin temperature, a change in blood pressure, a change in muscle activity, and/or a change in brain wave activity. For example, there are many different types of brain waves generated by the human brain in different conditions. Alpha waves are present only when a person is awake with her eyes closed but otherwise mentally alert. Alpha waves go away when the person's eyes are open or she is concentrating. Beta waves are normally found when a person is alert or when he has taken high doses of certain medicines, such as benzodiazepines. Delta waves are normally found only in young children and in people who are asleep. Theta waves are normally found only in young children and in people who are asleep. Thus, the level of attention or consciousness can be determined for the consumer influences the types of brain waves detected.

Behavioral data 1332 can be generated by the presentation device 1304 based on the received input from the one or more devices 1320 and 1322. The behavioral data 1332 can indicate a change in the physical or physiological condition of the consumer in reaction to the presented content. Generating the behavioral data 1332 can comprise monitoring the physical or physiological condition of the consumer as indicated by the received input from the one or more devices 1320 and 1322 and comparing the physical or physiological condition of the consumer at a first time to the physical or physiological condition of the consumer at a second time. For example, monitoring the physical or physiological condition of the consumer can comprise the presentation device 1304 performing facial recognition for determining an emotional reaction. Additionally, or alternatively, monitoring the physical or physiological condition of the consumer can comprise the presentation device 1304 performing voice recognition to determine spoken words or utterances. Generating the behavioral data 1332 can comprise the presentation device 1304 determining a type of reaction as positive or negative, determining a degree of the reaction, and generating one or more fields of data in the behavioral data 1332 indicating the type of reaction and degree of reaction.

Concurrent with generating media viewing behavioral data 1332, the presentation device can receive 1525 input from a second set of one or more devices or sensors 1323. The input from the second set of one or more devices or sensors 1323 can indicate one or more electronically measurable physical conditions during the presenting of the content. For example, the second set of one or more devices or sensors 1323 can include but are not limited to a clock, one or more spatial sensors, one or more environmental sensors, or other physical sensors. Thus, the one or more electronically measurable physical conditions can comprise a time of day, a timestamp during presentation of the media, a duration of a condition, a location, a device type, or a device interaction.

The presentation device 1304 can then generate the experiential data 1334 comprising the received input from the second set of one or more devices or sensors 1323 and associated with the generated behavioral data 1332. For example, generating the experiential data 1332 can comprise the presentation device 1304 generating one or more fields of experiential data 1334 associated with the behavioral data 1332 and based on the received input from the second set of one or more devices or sensors 1323 and defining the one or more electronically measurable physical conditions. In some cases, the generated experiential data 1334 can also be associated with at least a portion of the media content 1314, i.e., a portion of the content being presented when the conditions were detected.

Once the presentation device 1304 has generated the media viewing behavioral data 1332 and media viewing experiential data 1334 have been generated, the presentation device 1304 can generate media experience data 1325 based on and comprising the received media contextual data 1330, the generated behavioral data 1332, and the generated experiential data 1334. As noted above, the received and presented media content 1314 can include or be associated with media contextual data 1316 identifying or defining the media content 1314. The media contextual data 1316 received from the media content provider system 1302 and/or the media contextual data 1330 in the media experience data 1328 generated by the presentation device 1304 can comprise one or more of a name, a title, a category, a genre, an artist or one or more comments for the received media content and, in one implementation, can comprise one or more metadata tags associated with the received media content 1314. Generating the media experience data 1328 by the presentation device 1304 can comprise correlating the media contextual data 1330, the behavioral data 1332, and the experiential data 1334. A media event 1336 can also be generated by the presentation device 1304 based on the received and presented media content 1314 and corresponding to the generated media experience data 1328. Generating the media event 1336 by the presentation device 1304 can comprise collecting the correlated media contextual data 1330, behavioral data 1332, and experiential data 1334 into a predefined format, e.g., suitable for communication through a standard interface such as an API, storage in a particular format such as a database schema, etc.

The presentation device 1304 can then provide the generated media event 1336 to a data management system 1306 in response to receiving and presenting the media content 1314. Providing the generated media event 1336 to the data management system can comprise the presentation device 1304 providing the generated media event 1336 and associated media experience data 1328, i.e., comprising the contextual data 1330, behavioral data 1332, and experiential data 1334, through an API 1340 provided, for example, by a communication device 1338 coupled with the presentation device 1304. In some cases, the generated media event 1336 and associated media experience data 1328 can be provided by the presentation device 1304 directly to the data management system 1306 or through the API 1340 of the communication device 1338 over a network 1343 in response to a request from the data management system 1306. Additionally, or alternatively, the generated media event 1336 and associated media experience data 1328 can be provided by the presentation device 1304 to the data management system 1306 with a request from the presentation device 1304 to the data management system 1306, e.g., a query or request for additional, new content based on the media event 1336 and media experience data 1328. The generated media experience data 1328 collected into and/or associated with the media event 1336 can comprise an indication to the data management system 1306 of a preference of the consumer related to the media content 1314. Thus, new media content can be provided by the media content provider 1302 to the presentation device 1304, based on instructions from the data management system 1306 and responsive to the provided media event 1336 and media experience data 1328.

The data manager system 1306 can comprise one or more repositories 1346-1352 for storing information received from the presentation device 1304. For example, the data management system 1306 can maintain a repository of contextual data 1346, a repository of behavioral data 1348, a repository of experiential data 1350, and/or a repository of media event data 1352. The data management system 1306 can include one or more applications or modules for performing indexing 1354 on the repositories 1346-1352, data aggregation 1356 of the media event 1336 and media experience data 1328 received from the presentation device 1304 and/or stored in the repositories 1346-1352, and/or searching or querying 1358 of the data stored in the repositories 1346-1352. The data management system 1306 can additionally or alternatively execute one or more data analysis applications 1360. Generally speaking and as described above, the data analysis applications 1360 can use the media event 1336 and media experience data 1328 received from the presentation device 1304 and/or the data stored in the repository of contextual data 1346, repository of behavioral data 1348, repository of experiential data 1350, and/or repository of media event data 1352 to generated a set of connectedness data 1362 indicating a degree to which the consumer or view was engaged with the provided media content 1314 when presented. This connectedness data 1362 can then be used by the data management system 1306 to direct or request additional, new content to be provided by the media content provider system 1302 to the presentation device 1304.

The data analysis applications 1360 can, in some cases, use data provided by the user profile manager 1308 to generate the connectedness data 1362. For example, the user profile manager 1308 can receive from the presentation device 1304 and/or communication device 1338 through a web service 1344. This data can be used to generate a user profile 1364 for the user of the presentation device 1304. Additionally or alternatively, the user profile manager 1308 can execute one or more information exchange control applications 1366 and/or social media access control applications 1368 to collect profile information from various sources of the system 1300 and/or various social media networks or sources. User profile 1364 information can then be used by the data analysis applications 1360 to determine a degree to which certain content matches the preferences indicated in the user profile 1364 which can then be indicated in the connectedness data 1362. Additionally or alternatively, the data management system 1306 and/or user profile manager 1308 can use the connectedness data 1362 to update the user profile 1364 for the consumer based on received media event 1336 and media experience data 1328 and/or the data stored in the repository of contextual data 1346, repository of behavioral data 1348, repository of experiential data 1350, and/or repository of media event data 1352.

Figure 14:
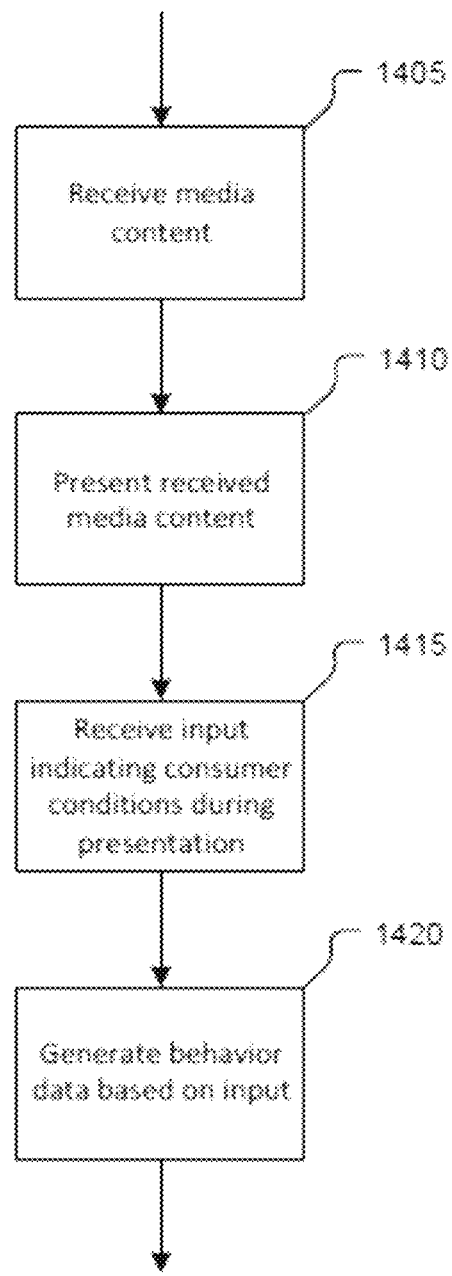
FIG. 14 is a flowchart illustrating an exemplary process for generating media viewing behavioral data according to one embodiment.

FIG. 14 is a flowchart illustrating an exemplary process for generating media viewing behavioral data according to one embodiment. As illustrated in this example, generating media viewing behavioral data can comprise receiving 1405 and presenting 1410, by a presentation device, media content as described above. For example, the media content can comprise video, audio, text, multi-media, or other such content received from a media content provider over one or more wired or wireless networks such as a Content Distribution Network (CDN), the Internet, or any one or more other local or wide area networks. Presenting the content can comprise, for example, displaying, playing out, projecting, or otherwise providing the content in a form through which the consumer may see, hear, or otherwise sense or experience the content.

While the media content is being presented 1410, input from one or more devices can be received 1415 by the presentation device. The input can indicate at least one physical or physiological condition of a consumer of the presented content while the content is being presented. For example, the one or more devices can comprise a camera, a microphone, or a wearable device and the received input can comprise audio of the consumer from the microphone, video of the consumer from the camera, or physiological information of the consumer from the wearable device. In some cases, the wearable device may comprise a device capable of detecting brain waves and/or muscle movements or activity.

The received input from the one or more devices can indicate a change in the physical or physiological condition of the consumer in reaction to the presented content. The change in the physical or physiological condition of the consumer can comprise one or more of a change of facial expression, a movement of the consumer's head, face, eyes, mouth, body, or hands, a spoken word, a sound, a vocalization, a change in heart rate, a change in respiration, a change in skin temperature, a change in blood pressure, a change in muscle activity, and/or a change in brain wave activity. For example, there are many different types of brain waves generated by the human brain in different conditions. Alpha waves are present only when a person is awake with her eyes closed but otherwise mentally alert. Alpha waves go away when the person's eyes are open or she is concentrating. Beta waves are normally found when a person is alert or when he has taken high doses of certain medicines, such as benzodiazepines. Delta waves are normally found only in young children and in people who are asleep. Theta waves are normally found only in young children and in people who are asleep. Thus, the level of attention or consciousness can be determined for the consumer influences the types of brain waves detected.

Behavioral data can be generated 1420 by the presentation device based on the received input. The behavioral data can indicate a change in the physical or physiological condition of the consumer in reaction to the presented content. Generating 1420 the behavioral data can comprise monitoring the physical or physiological condition of the consumer as indicated by the received input and comparing the physical or physiological condition of the consumer at a first time to the physical or physiological condition of the consumer at a second time. For example, wherein monitoring the physical or physiological condition of the consumer further comprises performing facial recognition for determining an emotional reaction. Additionally or alternatively, monitoring the physical or physiological condition of the consumer can comprise performing voice recognition to determine spoken words or utterances. Generating 1420 the behavioral data can comprise determining a type of reaction as positive or negative, determining a degree of the reaction, and generating one or more fields of data indicating the type of reaction and degree of reaction.

Figure 15:
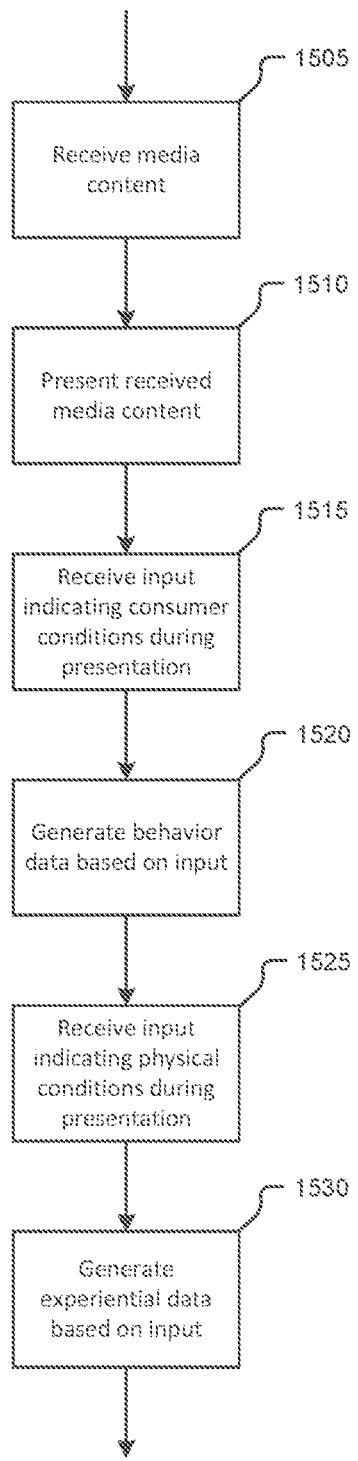
FIG. 15 is a flowchart illustrating an exemplary process for generating media viewing experiential data according to one embodiment.

FIG. 15 is a flowchart illustrating an exemplary process for generating media viewing experiential data according to one embodiment. As illustrated in this example, generating media viewing experiential data can comprise first generating 1505-1520 media viewing behavioral data as described above with reference to FIG. 14. As described above, generating media viewing behavioral data can comprise receiving 1505 and presenting 1510, by a presentation device, media content as described above. While the media content is being presented 1510, input from a first set of one or more devices can be received 1515 by the presentation device. The input can indicate at least one physical or physiological condition of a consumer of the presented content while the content is being presented. For example, the first set of one or more devices can comprise one or more of a camera, a microphone, or a wearable device and the received input can comprise audio of the consumer from the microphone, video of the consumer from the camera, or physiological information of the consumer from the wearable device. Behavioral data can be generated 1520 by the presentation device based on the received input. The generated 1520 the behavioral data can indicate a type of reaction as positive or negative and a degree of reaction based on monitoring the received input from the first set of one or more devices.

Concurrent with generating media viewing behavioral data 1505-1520, the presentation device can receive 1525 input from a second set of one or more devices. The input from the second set of one or more devices can indicate one or more electronically measurable physical conditions during the presenting of the content. For example, the second set of one or more devices can include but are not limited to a clock, one or more spatial sensors, one or more environmental sensors, or other physical sensors. Thus, the one or more electronically measurable physical conditions can comprise a time of day, a timestamp during presentation of the media, a duration of a condition, a location, a device type, or a device interaction.

The presentation device can then generate 1530 the experiential data comprising the received input from the second set of one or more devices and associated with the generated behavioral data. For example, generating 1530 the experiential data comprises generating one or more fields of data for the associated behavioral data based on the received input from the second set of one or more sensors and defining the one or more electronically measurable physical conditions. In some cases, the generated experiential data can also be associated with at least a portion of the media content, i.e., a portion of the content being presented when the conditions were detected.

Figure 16:
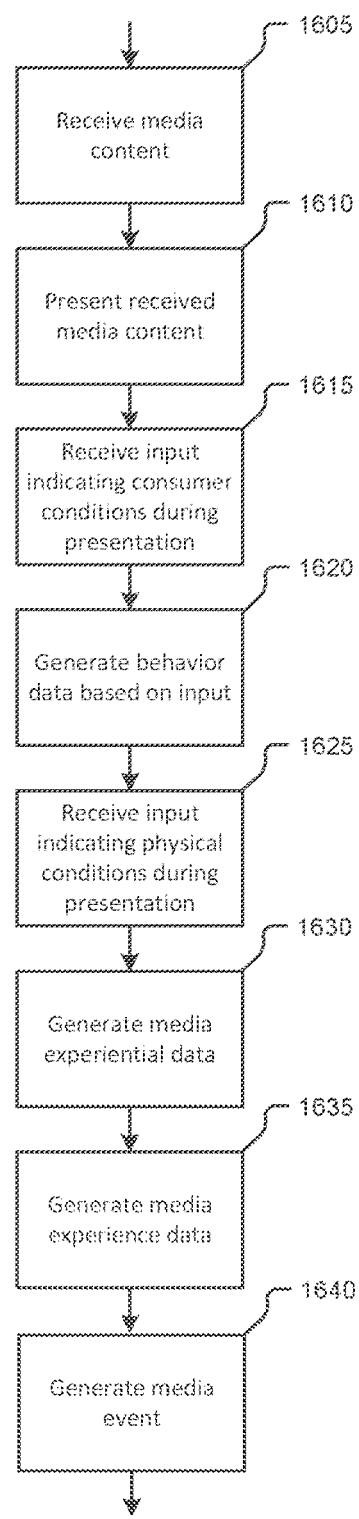
FIG. 16 is a flowchart illustrating an exemplary process for generating media viewing experience data according to one embodiment.

FIG. 16 is a flowchart illustrating an exemplary process for generating media viewing experience data according to one embodiment. As illustrated in this example, generating media viewing experiential data can comprise first generating 1605-1620 media viewing behavioral data as described above with reference to FIG. 14 and generating 1625-1630 media viewing experiential data as described above with reference to FIG. 15.

As described above, generating media viewing behavioral data can comprise receiving 1605 and presenting 1610, by a presentation device, media content as described above. The media content can include media contextual data identifying or defining the media content. While the media content is being presented 1610, input from a first set of one or more devices can be received 1615 by the presentation device. The input can indicate at least one physical or physiological condition of a consumer of the presented content while the content is being presented. For example, the first set of one or more devices can comprise one or more of a camera, a microphone, or a wearable device and the received input can comprise audio of the consumer from the microphone, video of the consumer from the camera, or physiological information of the consumer from the wearable device. Behavioral data can be generated 1620 by the presentation device based on the received input. The generated 1620 the behavioral data can indicate a type of reaction as positive or negative and a degree of reaction based on monitoring the received input from the first set of one or more devices.

Also as described above, generating 1625-1630 media viewing experiential data can comprise receiving 1625, by the presentation device, input from a second set of one or more devices, e.g., a clock, one or more spatial sensors, one or more environmental sensors, or other physical sensors. The input from the second set of one or more devices can indicate one or more electronically measurable physical conditions during the presenting of the content, e.g., a time of day, a timestamp during presentation of the media, a duration of a condition, a location, a device type, or a device interaction. The presentation device can then generate 1630 the experiential data by generating one or more fields of data for the associated behavioral data based on the received input from the second set of one or more sensors and defining the one or more electronically measurable physical conditions and associating the generated experiential data with at least a portion of the media content.

Once the media viewing behavioral data and media viewing experiential data have been generated 1605-1630, the presentation device can generate 1635 media experience data based on the received media contextual data, the generated behavioral data, and the generated experiential data. As noted above, the received 1605 and presented 1610 media content can include or be associated with media contextual data identifying or defining the media content. The media contextual data can comprise one or more of a name, a title, a category, a genre, an artist or one or more comments for the received media content and, in one implementation, can comprise one or more metadata tags associated with the received media content. Generating 1635 the media experience data can comprise correlating the media contextual data, the behavioral data, and the experiential data. A media event can also be generated 1640 by the presentation device based on the received 1605 can presented 1610 media content and corresponding to the generated 1635 media experience data. Generating 1640 the media event can comprise collecting the correlated media contextual data, behavioral data, and experiential data into a predefined format, e.g., suitable for communication through a standard interface such as an API, storage in a particular format such as a database schema, etc.

Figure 17:
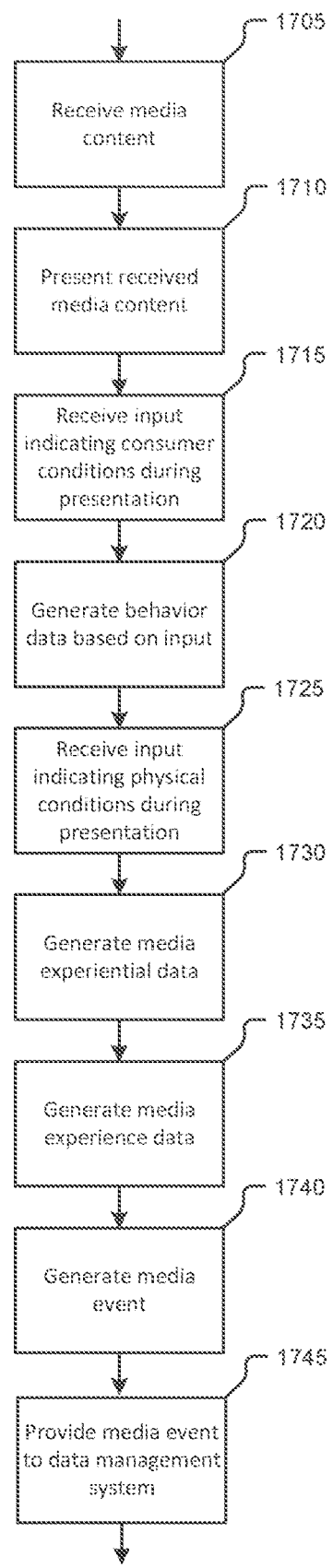
FIG. 17 is a flowchart illustrating an exemplary process for providing information related to media content according to one embodiment.

FIG. 17 is a flowchart illustrating an exemplary process for providing information related to media content according to one embodiment. As illustrated in this example, providing information related to media content can comprise first generating 1705-1720 media viewing behavioral data as described above with reference to FIG. 14 and generating 1725-1730 media viewing experiential data as described above with reference to FIG. 15. Media viewing experience data can then be generated 1735 and 1740 as described above with reference to FIG. 16.

As described above, generating media viewing behavioral data can comprise receiving 1705 and presenting 1710, by a presentation device, media content as described above. The media content can include media contextual data identifying or defining the media content. While the media content is being presented 1710, input from a first set of one or more devices can be received 1715 by the presentation device. The input can indicate at least one physical or physiological condition of a consumer of the presented content while the content is being presented. For example, the first set of one or more devices can comprise one or more of a camera, a microphone, or a wearable device and the received input can comprise audio of the consumer from the microphone, video of the consumer from the camera, or physiological information of the consumer from the wearable device. Behavioral data can be generated 1720 by the presentation device based on the received input. The generated 1720 the behavioral data can indicate a type of reaction as positive or negative and a degree of reaction based on monitoring the received input from the first set of one or more devices.

As also described above, generating 1725-1730 media viewing experiential data can comprise receiving 1725, by the presentation device, input from a second set of one or more devices, e.g., a clock, one or more spatial sensors, one or more environmental sensors, or other physical sensors. The input from the second set of one or more devices can indicate one or more electronically measurable physical conditions during the presenting of the content, e.g., a time of day, a timestamp during presentation of the media, a duration of a condition, a location, a device type, or a device interaction. The presentation device can then generate 1730 the experiential data by generating one or more fields of data for the associated behavioral data based on the received input from the second set of one or more sensors and defining the one or more electronically measurable physical conditions and associating the generated experiential data with at least a portion of the media content.

Once the media viewing behavioral data and media viewing experiential data have been generated 1705-1730, the presentation device can generate 1735 media experience data based on the received media contextual data, the generated behavioral data, and the generated experiential data. As noted above, generating 1735 the media experience data can comprise correlating the media contextual data, the behavioral data, and the experiential data. A media event can also be generated 1740 by the presentation device based on the received 1705 can presented 1710 media content and corresponding to the generated 1735 media experience data. Generating 1740 the media event can comprise collecting the correlated media contextual data, behavioral data, and experiential data into a predefined format, e.g., suitable for communication through a standard interface such as an API, storage in a particular format such as a database schema, etc.

The presentation device can the provide 1745 the generated 1740 media event to a data management system in response to receiving 1705 and presenting 1710 the media content. Providing 1745 the generated media event to the data management system can comprise providing the generated media event through an API. In some cases, the generated media event can be provided 1745 to the data management system in response to a request from the data management system. Additionally, or alternatively, the generated media event can be provided 1745 to the data management system with a request from the presentation device to the data management system. The generated 1735 media experience data collected into the media event can comprise an indication to the data management system of a preference of the consumer related to the media content and media event. Thus, new media content can be provided to the presentation device, based on the provided media event.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for improving a user experience through the use of at least one communications device, the method comprising:
   initially sensing feedback of the user experience, wherein the user experience comprises at least one of three dimensional geolocation status, temporal status, experiential status, physiological status and emotional status;
   creating at least an initial contextual data set from the initially sensed feedback;
   transmitting media content to the user;
   subsequent sensing feedback of the user experience by interpreting behaviors of the user, the behaviors comprising at least one of facial expressions, facial features, emotions, attention level, physical movement, physical objects and speech audio;
   creating at least one subsequent contextual data set from the subsequent sensed feedback based on dynamic, spontaneous conditions detected by content consumption;
   measuring changes in the user experience by comparing the initial contextual data set with the subsequent contextual data set; and
   generating personalized user data based on the measuring changes, the generated personalized data indicative of adjustments in the at least one of three dimensional geolocation status, temporal status, experiential status, physiological status and emotional status of the user in the comparing of the initial contextual data set with the subsequent contextual data set.

2. The method of claim 1, further comprising:
   transmitting additional media content to the user;
   additional sensing feedback of the user experience;
   creating at least one of an additional contextual data set from the additional sensed feedback;
   measuring additional changes in the user experience by comparing the subsequent contextual data set with the additional sensed feedback; and
   generating revised personalized user data based on the measured additional changes corresponding with the comparing of the subsequent contextual data set with the additional contextual data set.

3. The method of claim 2, further comprising:
   creating an event based on each of the generated revised personalized user data; and
   storing the event within in a data management system; and
   comparing the event with a set of user preferences stored.

4. The method of claim 3, further comprising:
   selecting the media content corresponding with the comparing the event with a set of user preferences stored.

5. The method of claim 4, wherein at least one of the initially sensing feedback, the subsequent sensing feedback and the additional sensing feedback including receiving input from at least one an audio source, a video source, and a wearable device.

6. The method of claim 5, wherein at least one of the initial contextual data set, the subsequent contextual data set, and the additional contextual data set corresponds with a degree of reaction to the user experience, reflective of at least of the at least one of the three dimensional geolocation status, the temporal status, the experiential status, the physiological status and the emotional status.

7. The method of claim 6, wherein the at least one of the media content and the additional media content comprises at least one metadata tags defined by at least one of an identified, a name, at least a title, a at least a category, at least a genre, at least an artist, at least an image, at least a video, at least a text, and media content.

8. The method of claim 7, wherein at least one of the stored event and the selected media content cooperates with an Application Programming Interface.

9. The method of claim 4, further comprising:
   selecting the media content from a library in response to with the comparing the event with a set of user preferences stored.

10. A user experience system comprising:
   a processor; and
   a memory coupled with and readable by the processor and storing therein a set of instructions which, when executed by the processor, causes the processor to:
   initially sense feedback of the user experience, wherein the user experience comprises at least one of three dimensional geolocation status, temporal status, experiential status, physiological status and emotional status,
   create at least an initial contextual data set from the initially sensed feedback;
   transmit media content to the user;
   subsequently sense feedback of the user experience by interpreting behaviors of the user, the behaviors comprising at least one of facial expressions, facial features, emotions, attention level, physical movement, physical objects and speech audio;
   create at least one subsequent contextual data set from the subsequent sensed feedback based on dynamic, spontaneous conditions detected and afforded by mobile content consumption;
   measure changes in the user experience by comparing the initial contextual data set with the subsequent contextual data set; and
   generate personalized user data based on the measuring changes, the generated personalized data indicative of adjustments in the at least one of three dimensional geolocation, temporal status, experiential status, physiological status and emotional status of the user in the comparing of the initial contextual data set with the subsequent contextual data set.

11. The user experience system of claim 10, wherein the processor and memory cooperate to further:
transmit additional media content to the user;
additionally sense feedback of the user experience;
create at least one of an additional contextual data set from the additional sensed feedback;
measure additional changes in the user experience by comparing the subsequent contextual data set with the additional sensed feedback; and
generate revised personalized user data based on the measured additional changes corresponding with the comparing of the subsequent contextual data set with the additional contextual data set.

12. The user experience system of claim 11, wherein the processor and memory cooperate to further:
create an event based on each of the generated revised personalized user data; and
store the event within in a data management system; and
compare the event with a set of user preferences stored.

13. The user experience system of claim 12, wherein the processor and memory cooperate to further:
selecting the media content corresponding with the comparing the event with a set of user preferences stored.

14. The user experience system of claim 13, wherein at least one of the initially sensing feedback, the subsequent sensing feedback and the additional sensing feedback including receiving input from at least one an audio source, a video source, a wearable device.

15. The user experience system of claim 14, wherein at least one of the initial contextual data set, the subsequent contextual data set, and the additional contextual data set corresponds with a degree of reaction to the user experience, reflective of at least of the at least one of the three dimensional geolocation status, the temporal status, the experiential status, the physiological status and the emotional status.

16. The user experience system of claim 15, wherein the at least one of the media content and the additional media content comprises at least one metadata tags defined by at least one of an identified, a name, at least a title, a at least a category, a at least a genre, at least an artist, at least an image, at least a video, at least a text, and media content.

17. The user experience system of claim 16, wherein at least one of the stored event and the selected media content cooperates with an Application Programming Interface.

18. The user experience system of claim 17, wherein the processor and memory cooperate to further:
selecting the media content from a library in response to with the comparing the event with a set of user preferences stored.

* * * * *